(12) United States Patent
Tanno et al.

(10) Patent No.: US 7,920,231 B2
(45) Date of Patent: Apr. 5, 2011

(54) LIQUID CRYSTAL DISPLAY DEVICE

(75) Inventors: Junji Tanno, Chiba (JP); Koichi Igeta, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 12/796,074

(22) Filed: Jun. 8, 2010

(65) Prior Publication Data

US 2010/0245734 A1  Sep. 30, 2010

Related U.S. Application Data

(63) Continuation of application No. 12/176,566, filed on Jul. 21, 2008, now Pat. No. 7,750,998.

(30) Foreign Application Priority Data

Jul. 31, 2007  (JP) ................................ 2007-198403

(51) Int. Cl.
*G02F 1/1343* (2006.01)
*G02F 1/1335* (2006.01)

(52) U.S. Cl. .......................................... 349/106; 349/88

(58) Field of Classification Search .................... 349/88, 349/104, 105, 106
See application file for complete search history.

(56) References Cited

U.S. PATENT DOCUMENTS

| | | | | |
|---|---|---|---|---|
| 7,259,812 B2* | 8/2007 | Park et al. | ...................... | 349/106 |
| 7,605,891 B2* | 10/2009 | Chang | ............................ | 349/114 |
| 2006/0139527 A1* | 6/2006 | Chang et al. | .................. | 349/114 |
| 2008/0084376 A1* | 4/2008 | Hirota et al. | .................... | 345/88 |
| 2008/0180385 A1* | 7/2008 | Yoshida et al. | ............... | 345/102 |
| 2009/0009448 A1* | 1/2009 | Uehara et al. | ................... | 345/87 |
| 2009/0121992 A1* | 5/2009 | Asao et al. | ...................... | 345/88 |
| 2010/0007337 A1* | 1/2010 | Booth et al. | .................. | 324/149 |
| 2010/0097449 A1* | 4/2010 | Jeong et al. | ..................... | 348/59 |

FOREIGN PATENT DOCUMENTS

| | | |
|---|---|---|
| JP | 11-084365 | 3/1999 |
| JP | 2002-107709 | 4/2002 |
| JP | 2005-062220 | 3/2005 |

* cited by examiner

*Primary Examiner* — Akm E Ullah
(74) *Attorney, Agent, or Firm* — Antoneli, Terry, Stout & Kraus, LLP.

(57) ABSTRACT

A liquid crystal display device includes a first substrate, a second substrate, a liquid crystal layer, a light-shielding film, a plurality of subpixels on the first substrate, a first electrode for each of the subpixels, a second electrode for each of the subpixels, and a color filter formed on the second substrate for each of the subpixels. The second electrodes each include a plurality of linear portions, wherein the subpixels include first and second subpixels that are adjacent to each other. A signal line forms between the first subpixel and second subpixel, and the color filter is formed across the signal line in the same color, and the second electrodes of the first and second subpixels are formed separately, and the second electrode of the first subpixel is disposed to an area of the second subpixel beyond the signal line.

17 Claims, 20 Drawing Sheets

LIQUID CRYSTAL DISPLAY DEVICE

CROSS REFERENCE TO RELATED APPLICATION

This application is a continuation of U.S. Ser. No. 12/176,566, filed Jul. 21, 2008, now U.S. Pat. No. 7,750,998, the contents of which are incorporated herein by reference.

BACKGROUND OF THE INVENTION

1. Field of the Invention

The present invention relates to a liquid crystal display device and, more specifically, to a technology that is effective when applied to a liquid crystal display device including a color filter.

2. Background Art

For color display, a liquid crystal display device is provided with a color filter irrespective of display mode. The colors used for a color filter basically include red (R), green (G), and blue (B), and these three colors of red, green, and blue configure a basic unit, i.e., a pixel.

The invention relates to a liquid crystal display device including a color filter, and the related art of the invention includes the technologies of JP-A-11-84365, JP-A-2002-107709, and JP-A-2005-62220.

The technologies described in JP-A-11-84365, JP-A-2002-107709, and JP-A-2005-62220 are those for arrangement of subpixels in order of RGBBGR.

The issue here is that such related art, i.e., JP-A-11-84365, JP-A-2002-107709, and JP-A-2005-62220, fails to describe an attempt to increase an aperture ratio with no light-shielding film (BM) formed to the pixel boundary between any adjacent two subpixels of the same color.

SUMMARY OF THE INVENTION

In a liquid crystal display device, for avoiding color mixture of red, green, and blue, a light-shielding film such as black matrix is generally provided between subpixels. The reasons for the need for a light-shielding film are mainly as below.

1. For manufacturing a color filter, first of all, a black matrix is formed by photolithography, and then a color resist is formed in order of red, green, and blue also by photolithography. At this time, during the photolithography for forming the resist patterns of red, green, and blue, although some space between colors or color overlap is observed due to pattern displacement, not to cause any influence thereof on display, a manufacturing margin is taken in advance for forming a black matrix.

2. When substrates are overlaid one on the other, i.e., a TFT (Thin-Film Transistor) substrate (array substrate) and a CF (Color Filter) substrate, some matching displacement is observed therebetween. When the displacement is large, although any adjacent subpixels may look different in color, not to cause any influence thereof on display, a manufacturing margin is taken in advance for forming a black matrix.

If no light-shielding film is provided, the matching displacement during manufacturing causes color mixture between subpixels of different colors, thereby considerably degrading the display quality, e.g., reducing the color reproducibility. However, for prevention of such color mixture, providing a light-shielding film between subpixels causes another problem of reducing the aperture ratio.

When the pixel size is large, the influence of the reduction of the aperture ratio is small. However, as the pixel size is reduced with an increase of addressability, the ratio of the light-shielding film to the area of the subpixels is increased, thereby reducing the aperture ratio. Because the lower aperture ratio resultantly reduces the luminance of display, the display quality is considerably reduced. There is another problem that, if a backlight is increased in luminance for keeping the luminance of display, the power consumption is resultantly increased.

The present invention is proposed to solve such problems of the previous technologies, and an object thereof is to provide a technology that can increase the aperture ratio in liquid crystal display devices.

These and other objects and new features of the present invention will become more apparent from the following detailed description of the present invention when taken in conjunction with the accompanying drawings.

In the invention disclosed in this specification, typical aspects are briefly described as below.

That is, a first typical aspect of the invention is directed to a liquid crystal display device provided with a liquid crystal display panel, which includes a first substrate, a second substrate, and a liquid crystal layer sandwiched between the first and second substrates. The liquid crystal display panel includes a light-shielding film, and a plurality of subpixels arranged in a matrix. The subpixels each include a first electrode formed on the first substrate, a second electrode formed on a layer upper than the first electrodes, and a color filter formed on the second substrate. The liquid crystal display device generates an electric field by the first and second electrodes, and drives the liquid crystal material of a liquid crystal layer. In the liquid crystal display device, the second electrodes each include a plurality of linear portions, the subpixels include any two subpixels that are adjacent to each other in a direction of a display line with the color filters of the same color, the light-shielding film is formed on the second substrate not to cover a pixel boundary between the two adjacent subpixels but to cover pixel boundaries of the remaining subpixels, and the second electrodes of the two adjacent subpixels are formed separately. Assuming that the two adjacent subpixels are first and second subpixels, at least the second electrode of the first subpixel is disposed to an area of the second subpixel beyond the pixel boundary between the first and second subpixels.

In a second typical aspect, in the second electrode of the first subpixel, when viewed from above, at least one of the linear portions thereof is overlaid on the pixel boundary between the first and second subpixels.

In a third typical aspect, in the second electrode of the first subpixel, at least one of the linear portions thereof is disposed to the area of the second subpixel.

In a fourth typical aspect, the first and second subpixels share the same color filter.

In a fifth typical aspect, the subpixels are divided into first and second groups each including three of the subpixels, and the subpixels in the first group are arranged in order of first, second, and third colors, and the subpixels in the second group are arranged in order of third, second, and first colors, and the three subpixels in the first group and the three subpixels in the second group are alternately disposed in the direction of the display line.

In a sixth typical aspect, a liquid crystal display panel includes a first video line for input of a video signal to the first subpixel, and a second video line for input of a video signal to the second subpixel, and the first and second video lines are disposed to be opposed to each other with the pixel boundary of the first and second subpixels located therebetween.

In a seventh typical aspect, the second electrode is disposed on the layer upper than the first electrode with an insulation film disposed therebetween.

In an eighth typical aspect, the second electrode is a pixel electrode, and the first electrode is a flat-shaped opposing electrode.

In a ninth typical aspect, in the second electrode, the linear portions are each bent.

In a tenth typical aspect, the linear portions include a first linear portion extending along a direction orthogonal to the direction of the display line, a plurality of second linear portions each being protruded from the first linear portion with a slope of θ (where θ is 70 to 87°) with respect to the first linear portion, and being disposed at predetermined intervals in a direction along which the first linear portion is extended, and a plurality of third linear portions each being protruded to a side opposite to the second linear portions from the first linear portion with a slope of −θ with respect to the first linear portion, and being disposed at predetermined intervals in the direction along which the first linear portion is extended. The second electrode of the first subpixel is disposed also to the area of the second subpixel with the third linear portions each beyond the pixel boundary between the first and second subpixels, and the second electrode of the second subpixel is also disposed to an area of the first subpixel with the third linear portions each beyond the pixel boundary between the first and second subpixels.

With the effect to be achieved by the typical aspects of the invention described in this application, an aperture ratio can be increased in a liquid crystal display device provided with a color filter.

DETAILED DESCRIPTION OF THE EMBODIMENTS

Figure 1:
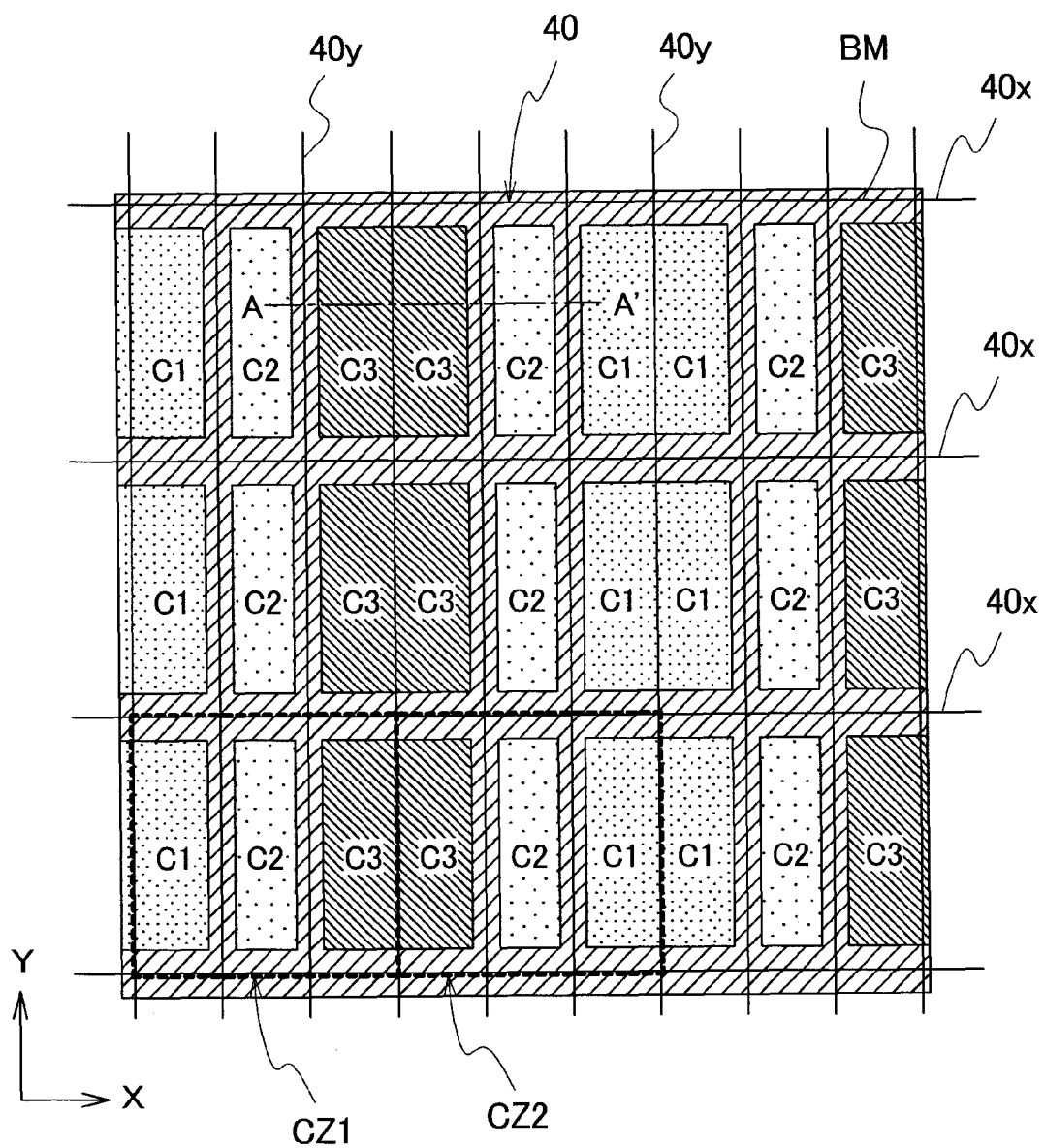
FIG. 1 is a plan view of a transmissive liquid crystal display device of IPS (In-Plane Switching) mode in a first embodiment of the invention, showing the layout of color filters in a liquid crystal display panel.

In the below, embodiments of the invention are described in detail by referring to the accompanying drawings. In the drawings for use to describe the embodiments of the invention, any components having the same function are provided with the same reference numeral, and not described twice.

The display method for an active-matrix liquid crystal display device can be classified into a TN (Twisted Nematic) mode and an IPS (In-Plane Switching) mode. Described in the following embodiments are examples of applying the invention to an active-matrix liquid crystal display device of IPS mode.

Herein, a minimum unit for display of characters and graphics is called a dot, and the dot being a minimum unit is called a pixel with liquid crystal displays.

With color display, colors of R (red), G (green), and B (blue) are collectively referred to as pixel because a pixel is divided into these three colors, and one-third (⅓) dot as a result of RGB division is called a subpixel. As alternatives to RGB, colors of cyan, magenta, and yellow will also do.

First Embodiment

In a first embodiment, described is an example of applying the invention to a transmissive liquid crystal display device of IPS mode.

Figure 2:
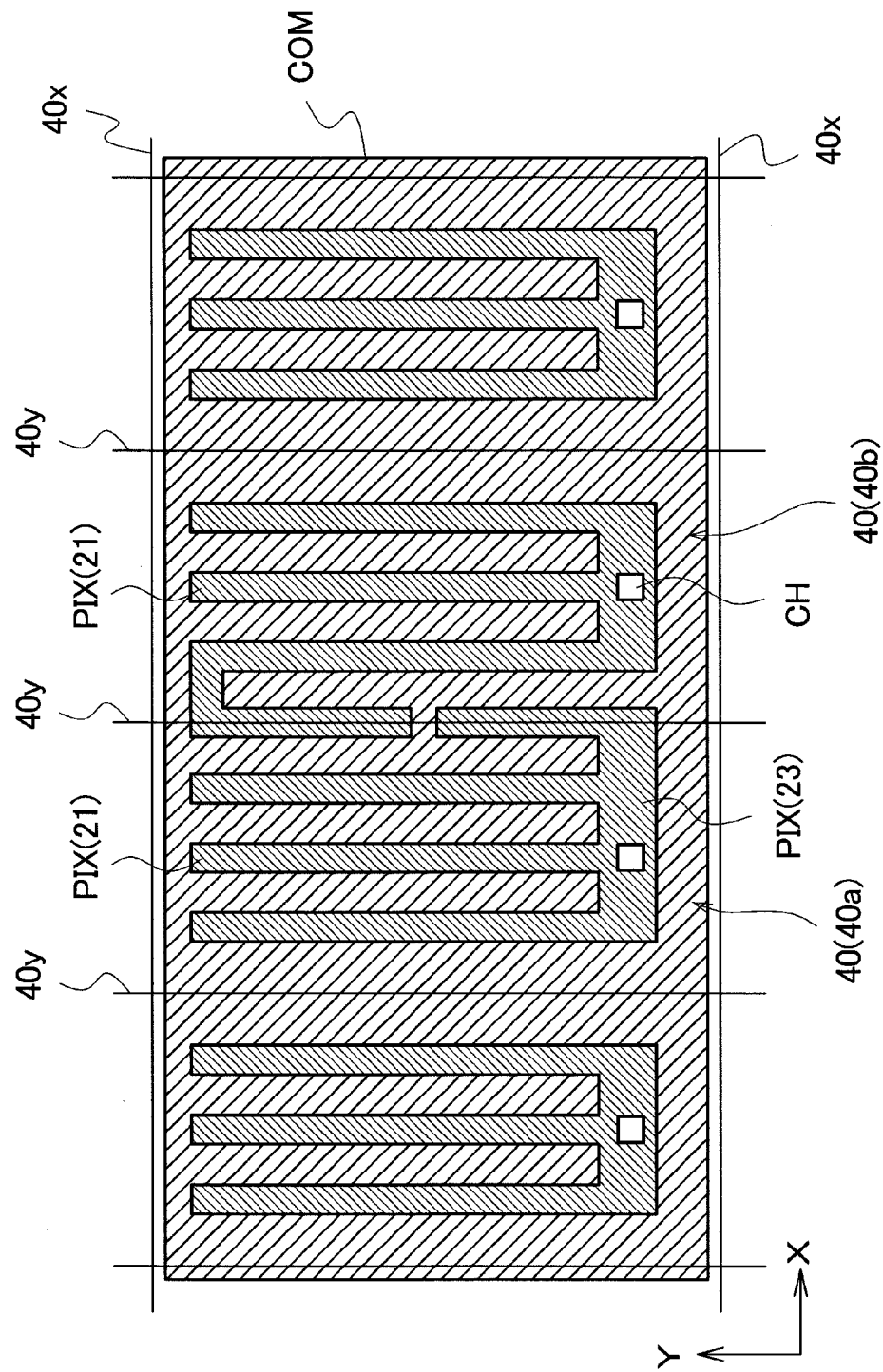
FIG. 2 is a plan view of the liquid crystal display panel in the first embodiment of the invention, showing pixel electrodes and opposing electrodes on the side of a TFT substrate thereof.
Figure 3:
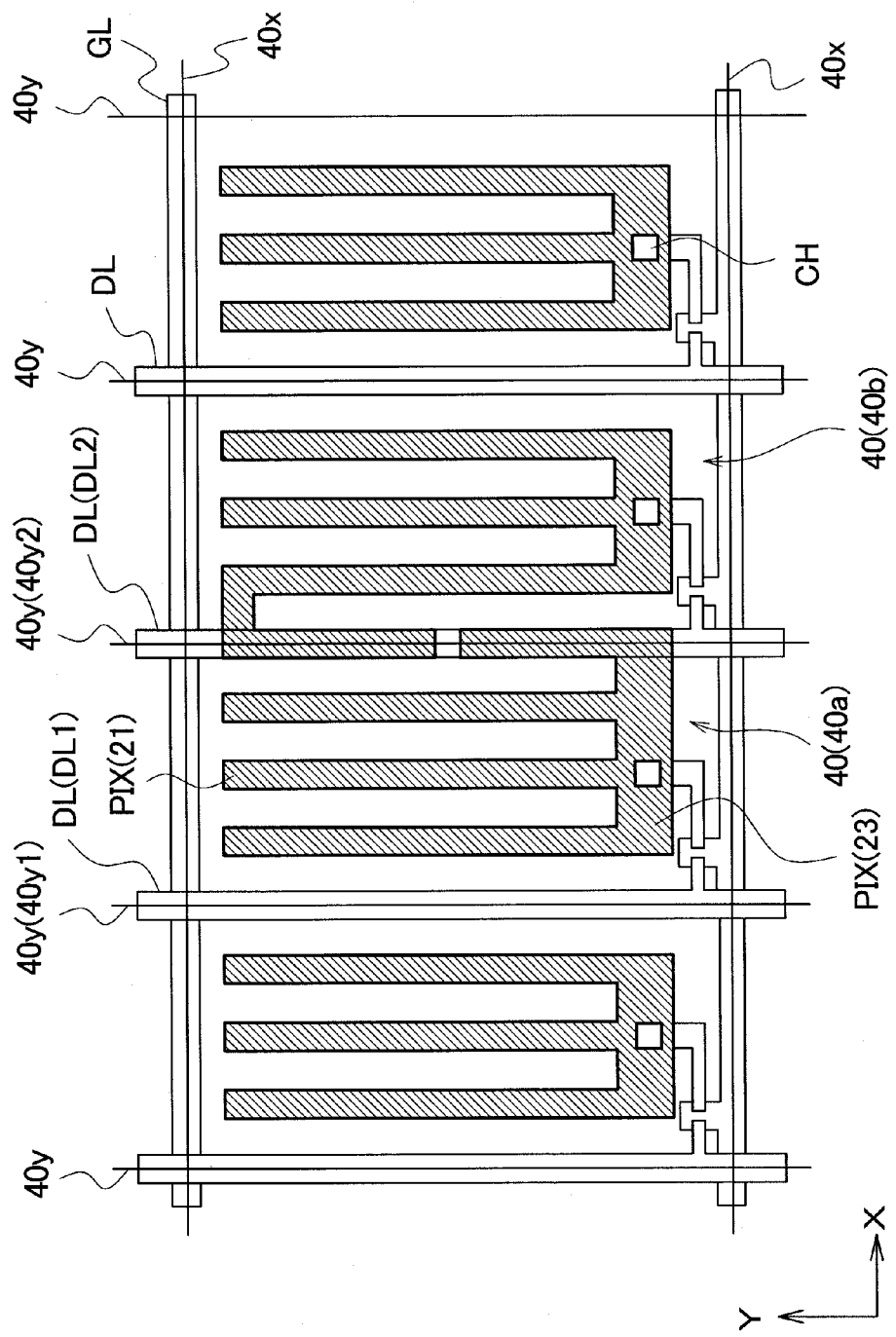
FIG. 3 is a plan view of the liquid crystal display panel in the first embodiment of the invention, showing the pixel electrodes, scan lines, and video lines on the side of the TFT substrate thereof.
Figure 4:
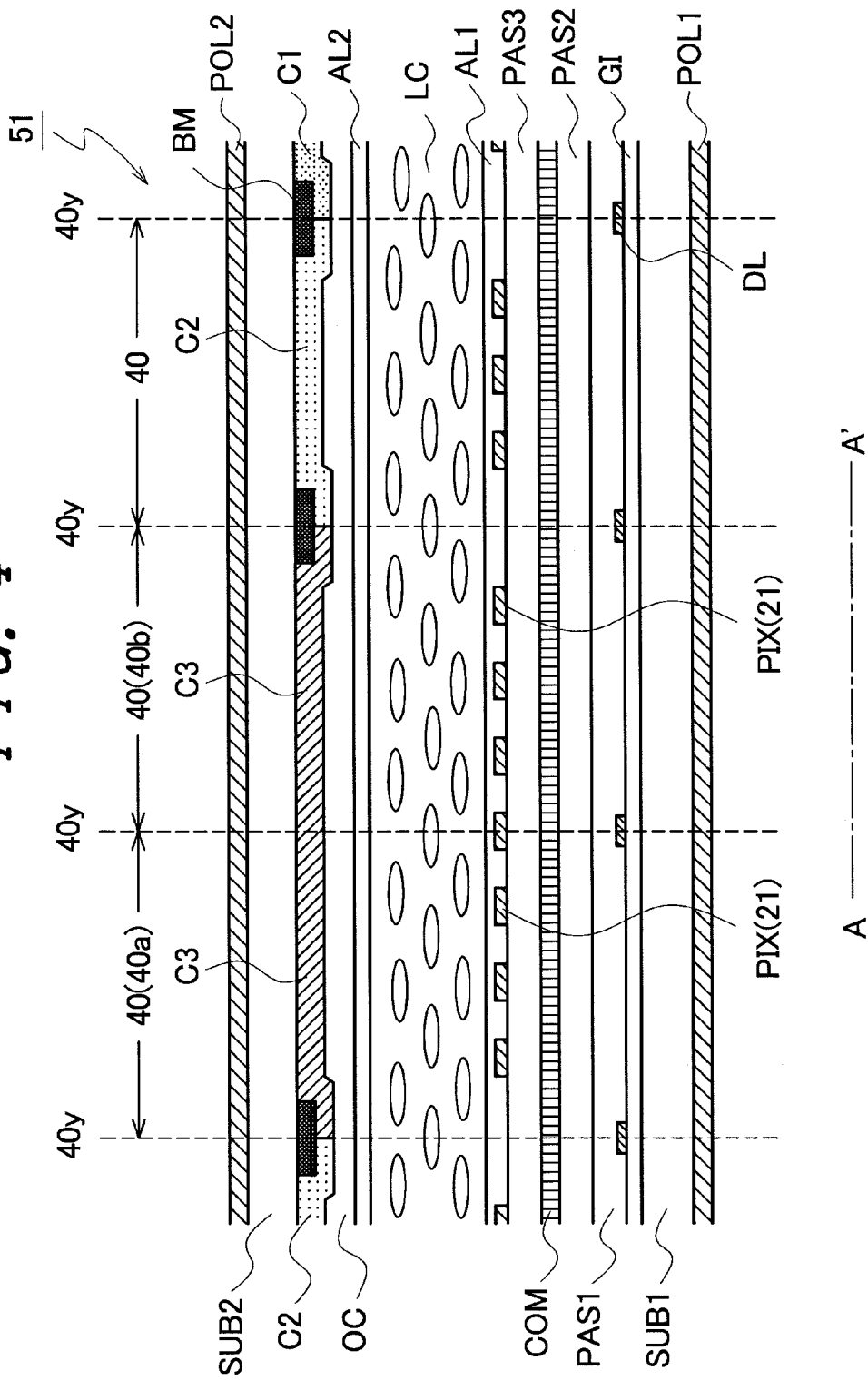
FIG. 4 is a cross-sectional view of the liquid crystal display panel in the first embodiment of the invention, showing the cross-sectional configuration thereof cut along a line A-A' of FIG. 1.

FIGS. 1 to 4 are each a diagram showing a transmissive liquid crystal display device of IPS mode in the first embodiment of the invention, i.e., FIG. 1 is a plan view of a liquid crystal display panel showing the layout of color filters, FIG. 2 is a plan view of the liquid crystal display panel showing pixel electrodes and opposing electrodes on the side of a TFT substrate, FIG. 3 is a plan view of the liquid crystal display panel showing the pixel electrodes, scan lines, and video lines on the side of the TFT substrate, and FIG. 4 is a cross-sectional view of the liquid crystal display panel showing the cross-sectional configuration thereof cut along a line A-A' of FIG. 1.

The transmissive liquid crystal display device of IPS mode in the first embodiment is provided with a liquid crystal display panel 51 of FIG. 4. As shown in FIG. 4, the liquid crystal display panel 51 is so configured that a liquid crystal layer (LC) is sandwiched between a pair of glass substrates (SUB1 and SUB2). The liquid crystal layer consists of a large number of molecules, and the main surface side of the glass substrate (SUB2) is the side for observation. As shown in FIG. 1, the liquid crystal display panel 51 includes a plurality of subpixels 40. As shown in FIG. 2, the subpixels 40 each include a pixel electrode (PIX) and an opposing electrode (COM; referred also to as common electrode), and any one of color filters C1, C2, and C3. The color filter C1 is of a red color (R), the color filter C2 is of a green color (G), and the color filter C3 is of a blue color (B).

As shown in FIG. 3, the liquid crystal display panel 51 includes a scan line (GL) and a video line (DL). When viewed from above, the scan line extends along a direction of X, and the video line extends in a direction of Y, which is orthogonal to the direction of X in the same plane. The scan line (GL) is plurally provided in the direction of Y at predetermined intervals, and the video line (DL) is plurally provided in the direction of X at predetermined intervals.

Note that the subpixels 40 are arranged in a matrix in the directions of X and Y. The subpixels 40 arranged along the direction of X configure a display line, and such a display line is plurally provided in the direction of Y.

In FIG. 1, a reference numeral 40$y$ denotes a pixel boundary between any two subpixels 40 adjacent to each other along the direction of the display lines, i.e., direction of X. A reference numeral 40$x$ denotes a pixel boundary between any two adjacent subpixels 40, i.e., assuming that any two adjacent display lines are first and second display lines, the reference numeral 40$x$ denotes a pixel boundary between the subpixel 40 of the first display line and the subpixel 40 of the second display line. In other words, the reference numeral 40$x$ denotes the pixel boundary between any two subpixels 40 adjacent to each other along the direction of Y.

Herein, the subpixel 40 having the color filter C1 of a red color is referred also to simply as red subpixel 40, the subpixel 40 having the color filter C2 of a green color as green subpixel 40, and the subpixel 40 having the color filter C3 of a blue color as blue subpixel 40.

As shown in FIG. 3, the subpixels 40 each include a thin-film transistor TFT, which is controllably turned ON and OFF by a scan signal (voltage) coming from the scan line (GL), and via such a thin-film transistor TFT, a video signal (voltage) coming from the video line (DL) is provided to the pixel electrode (PIX). The scan line (GL) is so disposed as to overlay on, when viewed from above, the pixel boundary 40$x$ between any two adjacent display lines, and the video line (DL) is so disposed as to overlay on, when viewed from above, the pixel boundary 40$y$ between any two subpixels 40 adjacent to each other along the direction of the display lines, i.e., direction of X.

As shown in FIG. 4, on the side of a liquid crystal layer (LC) of a glass substrate (SUB2; referred also to as CF substrate), in order from the glass substrate (SUB2) to the liquid crystal layer (LC), provided are a light-shielding film (BM; black matrix), color filters of red, green, and blue (C1, C2, and C3), a protection film (OC), an orientation film (AL2), and others. On the outside opposite to the liquid crystal layer (LC) of the glass substrate (SUB2), a polarizer (POL2) is disposed.

On the side of the liquid crystal layer (LC) of the glass substrate (SUB1; referred also to as TFT substrate), in order from the glass substrate (SUB1) to the liquid crystal layer (LC), provided are a scan line (GL; referred also to as gate line) (refer to FIG. 3), a gate insulation film (GI), a video line (DL; referred also to as source line or drain line), an insulation film (PAS1), another insulation film (PAS2), an opposing electrode (COM; referred also as common electrode), still another insulation film (PAS3), a pixel electrode (PIX), and an orientation film (AL1). On the outside opposite to the liquid crystal layer (LC) of the glass substrate (SUB1), a polarizer (POL1) is disposed.

As shown in FIGS. 2 and 3, the pixel electrode (PIX) is configured like a comb-toothed electrode. The comb-toothed electrode is provided with a coupling portion 23 and a plurality of linear portions 21. The coupling portion 23 extends along the direction in which the scan lines (GL) extend, i.e., direction of X, and the linear portions 21 each extend from the coupling portion 23 along the direction in which the video lines (DL) extend. The linear portions are disposed at regular intervals each along the direction in which the scan lines (GL) extend.

Note that, in this first embodiment, although the linear portions 21 are described as being a part of the pixel electrode (PIX), but the linear portions (21) may be each referred to as pixel electrode.

The opposing electrode (COM) is provided, for example, plurally as a result of partition on a display line basis (but the electrode is not necessarily partitioned), and the resulting opposing electrodes (COM) are each formed flat.

As shown in FIG. 4, the opposing electrodes (COM) and the pixel electrodes (PIX) are stacked via the insulation film (PAS3), thereby providing a retention volume. In this first embodiment, the pixel electrodes (PIX) are located upper than the opposing electrodes (COM). The opposing electrodes (COM) and the pixel electrodes (PIX) are each a transparent conductive film such as ITO (Indium Tin Oxide).

The liquid crystal layer (LC) is made of a positive or negative type liquid crystal material.

As an alternative configuration, a retardation plate may be provided, respectively, between the polarizers (POL1 and POL2) and the glass substrates (SUB1 and SUB2).

In the first embodiment, although the substrate of the liquid crystal display panel 51 is made of glass, this is surely not restrictive, and may be plastic or others as long as the material is insulative.

Although not shown, on the outside of the polarizer (POL1) on the side of the glass substrate (SUB1), a backlight is disposed. With light coming from the backlight, the liquid crystal display device becomes transmissive. With such a transmissive liquid crystal display device, the main surface side of the glass substrate (SUB2) is the side for observation.

With the transmissive liquid crystal display device of IPS type in the first embodiment, the pixel electrodes (PIX) and the opposing electrodes (COM) generate an electric field, thereby being able to reorient the liquid crystal molecules of the liquid crystal layer (LC) in the plane. The intensity of the electric field changes the phase difference of the liquid crystal layer (LC) so that the linear polarization having been passed through the polarizer (POL1) on the side of the glass substrate (SUB1) can change the phase in the liquid crystal layer (LC). In accordance with the phase change, a selection can be made for the light, i.e., "pass" or "not pass" the polarizer (POL2) on the opposite side. This thus enables to display the contrast of light on the surface side for observation.

By referring to FIGS. 1 to 4, described is the layout of the subpixels 40, i.e., layout of color filters, and the layout of the light-shielding films (BM).

The subpixels 40 are so disposed as to be adjacent to one another (are positioned next to each other) in at least any one of the three colors of red, green, and blue along the direction of the display lines, i.e., direction of X, and to include any two subpixels 40 (40*a*, 40*b*) whose color filters are of the same color. That is, the subpixels 40 are so disposed that, in at least any one of the three colors of red, green, and blue, any two subpixels 40 (40*a*, 40*b*) of the same color are adjacent to each other (are positioned next to each other) along the direction of the display lines. In the first embodiment, in the two colors of red and blue, the two subpixels 40 of the same color are so disposed as to be adjacent to each other along the direction of the display lines.

In such a layout, the subpixels 40 are divided into a first group (first pixel) CZ1 and a second group (second pixel) CZ2. The first group CZ1 includes the three subpixels 40 of red (C1), green (C2), and blue (C3) disposed in this order, and the second group CZ2 includes the three subpixels 40 of blue (C3), green (C2), and red (C1) disposed in this order. The three subpixels 40 in the first group (CZ1) and the three subpixels 40 in the second group (CZ2) are alternately disposed in the direction of the display lines, i.e., direction of X.

Note here that, the two subpixels 40 (40*a*, 40*b*) of the same color being adjacent to each other along the direction of the display lines, i.e., direction of X, share the same color filter. In the first embodiment, in the two colors of red and blue, the color filters (C1 and C3) are the same.

As shown in FIGS. 2 and 3, the subpixels 40 each separately have a pixel electrode (PIX). As such, also in any two subpixels 40 (40*a*, 40*b*) of the same color being adjacent to each other along the direction of the display lines, i.e., direction of X, their pixel electrodes (PIX) are separately provided.

As shown in FIGS. 1 and 4, the light-shielding film (BM) is so formed as not to cover the pixel boundary 40*y* of any two subpixels 40 (40*a*, 40*b*) of the same color being adjacent to each other in the direction of the display lines, i.e., direction of X, but to cover pixel boundaries (40*x*, 40*y*) of the remaining subpixels 40. That is, no light-shielding film (BM) is formed on the pixel boundary 40*y* between any two subpixels 40 (40*a*, 40*b*) of the same color being adjacent to each other along the direction of the display lines, i.e., direction of X.

When the color filters of any two subpixels 40 (40*a*, 40*b*) adjacent to each other along the direction of the display lines, i.e., direction of X, are of the same color, no color mixture will be caused, thereby not requiring a light-shielding film (BM) on the pixel boundary 40*y* between these two subpixels 40 (40*a*, 40*b*). With no light-shielding film (BM) required as such, the aperture ratio can be accordingly increased.

In the first embodiment, in the two colors of red and blue, the two subpixels 40 (40*a*, 40*b*) are disposed adjacent to each other along the direction of the display lines, i.e., direction of X, and the pixel boundary 40*y* between these subpixels 40 (40*a*, 40*b*) is not formed thereon with a light-shielding film (BM), thereby being able to increase the aperture ratio.

The higher aperture ratio accordingly increases the transmittance ratio of the liquid crystal display panel 51. When the backlight is constant in luminance, there are advantages that the higher aperture ratio accordingly increases the display luminance, and the display quality can be increased. Moreover, to achieve the display luminance of the same level, increasing the aperture ratio can reduce the luminance of the backlight, and the power consumption of the backlight can be favorably reduced.

Note that, in the first embodiment, described is the example that, in the two colors of red and blue among the three colors of red, green, and blue, any two subpixels 40 are so disposed as to be adjacent to each other along the direction of the display lines. The invention is surely not restrictive thereto, and the two colors may be red and green or green and blue, for example.

Moreover, the color may be any one of three colors of red, green, and blue. If this is the case, for example, the subpixels 40 are divided into a first group (first pixel) CZ1 and a second group (second pixel) CZ2. In the first group CZ1, three subpixels 40 of red (C1), green (C2), and blue (C3) are arranged in this order, and in the second group CZ2, three subpixels 40 of blue (C3), red (C1), and green (C2) are arranged in this order. The three subpixels 40 in the first group CZ1 and the three subpixels 40 in the second group CZ2 are alternately disposed in the direction of the display lines, i.e., direction of X. Note that, in such a case, i.e., with one color, the aperture ratio will be lower compared with a case with two colors.

In the first embodiment, the subpixels 40 are so disposed that the subpixels 40 of the same color are adjacent between any two adjacent display lines. That is, assuming that any two adjacent display lines are first and second display lines, the subpixels 40 of the first display line are so disposed as to achieve the color adjacency with the subpixels 40 of the second display line.

By referring to FIGS. 2 and 3, described next is the pixel electrode (PIX) of the subpixel 40. As described in the foregoing, the pixel electrode (PIX) of the subpixel 40 is configured like a comb-toothed electrode, including the coupling portion 23 and a plurality of linear portions 21. In this first embodiment, the pixel electrode PIX varies in number of linear portions 21 between the two subpixels 40 (40*a*, 40*b*) of the same color being adjacent to each other along the direction of the display lines, i.e., direction of X, and the remaining subpixels 40.

As shown in FIGS. 2 and 3, for example, the pixel electrode (PIX) of each of the two subpixels 40 (40*a*, 40*b*) of the same color being adjacent to each other along the direction of the display lines, i.e., direction of X, is configured like a comb-toothed electrode including four linear portions 21, but the pixel electrodes PIX of the remaining subpixels 40 are each configured like a comb-toothed electrode including three liner portions 21.

Moreover, in the two subpixels 40 (40*a*, 40*b*) of the same color being adjacent to each other along the direction of the display lines, i.e., direction of X, their pixel electrodes (PIX) look slightly different from each other when viewed from above. In the first embodiment, for example, in the pixel electrode (PIX) of the first subpixel 40 (40*a*), the four linear portions 21 each extend from the coupling portion 23 along the direction in which the video lines DL extend, and one of these four linear portions 21 located closest to the side of the second subpixel 40 (40b) is shorter than other three.

In the pixel electrode (PIX) of the second subpixel 40 (40b), three of these four linear portions 21 excluding the one located closest to the side of the first subpixel 40 (40a) are extending from the coupling portion 23 along the direction in which the video lines (DL) extend, and the linear portion 21 located closest to the side of the first subpixel 40 (40a) is formed as a piece with its adjacent linear portion on the side opposite to the coupling portion 23. Also in this pixel electrode (PIX) of the second subpixel 40 (40b), the linear portion 21 located closest to the side of the first subpixel 40 (40a) out of the four linear portions 21 is shorter than other three.

In the first embodiment, the first and second subpixels (40a, 40b) are so disposed that, in each of their pixel electrodes (PIX), at least one of the liner portions 21 is overlaid on the pixel boundary 40y between the first and second subpixels 40 (40a, 40b) when viewed from above. The pixel boundary 40y corresponds to the center line between the first and second subpixels 40 (40a, 40b).

That is, in the first embodiment, no light-shielding film (BM) is formed to the pixel boundary 40y between the first and second subpixels 40a and 40b of the same color being adjacent to each other along the direction of the display lines, i.e., direction of X, and the first and second subpixels 40 (40a, 40b) are so disposed that, in each of their pixel electrodes (PIX), at least one of the liner portions 21 is overlaid on the pixel boundary 40y between the first and second subpixels 40a and 40b when viewed from above. This thus enables to drive the liquid crystal molecules in the liquid crystal layer (LC) in the vicinity of the pixel boundary 40y between the first and second subpixels 40a and 40b, thereby being able to increase the display luminance of each of the first and second subpixels 40a and 40b in the first embodiment.

In the first embodiment, in the two colors of red and blue, the two subpixels 40 of the same color are disposed adjacent to each other along the direction of the display lines. For these two colors of red and blue, by disposing such a pixel electrode (PIX) of each of the two subpixels 40 (40a, 40b) of the same color being adjacent to each other along the direction of the display lines, i.e., direction of X, also to the area of the adjacent subpixel 40 beyond the pixel boundary 40y, more specifically, by disposing the pixel electrode (PIX) of the first subpixel 40a also to the area of the second subpixel 40b, and by disposing the pixel electrode (PIX) of the second subpixel 40b also to the area of the first subpixel 40a, the subpixels 40 of the colors of red and blue are both controlled in terms of polarization so that the amount of outgoing light can be favorably increased.

As such, in this embodiment, the subpixels 40 of the colors of red and blue can be both increased in transmission efficiency, and by sharing the increase of the transmission efficiency with the subpixels 40 of the color of green, e.g., by increasing the area occupied by the subpixels 40 of the color of green than the area occupied by the subpixels 40 of the remaining colors, the transmittance ratio can be increased for the color of white.

Note that, described in the first embodiment is the exemplary configuration in which the first and second subpixels 40a and 40b of the same color being adjacent to each other along the direction of the display lines, i.e., direction of X are so disposed that, in each of their pixel electrodes (PIX), at least one of the liner portions 21 is overlaid on the pixel boundary 40y between the first and second subpixels 40a, 40b when viewed from above. Alternatively, in the pixel electrode (PIX) at least of either the first or second subpixel 40a or 40b may be so disposed that at least one of the liner portions 21 is overlaid on the pixel boundary 40y between the first and second subpixels 40a and 40b when viewed from above.

Second Embodiment

Figure 5:
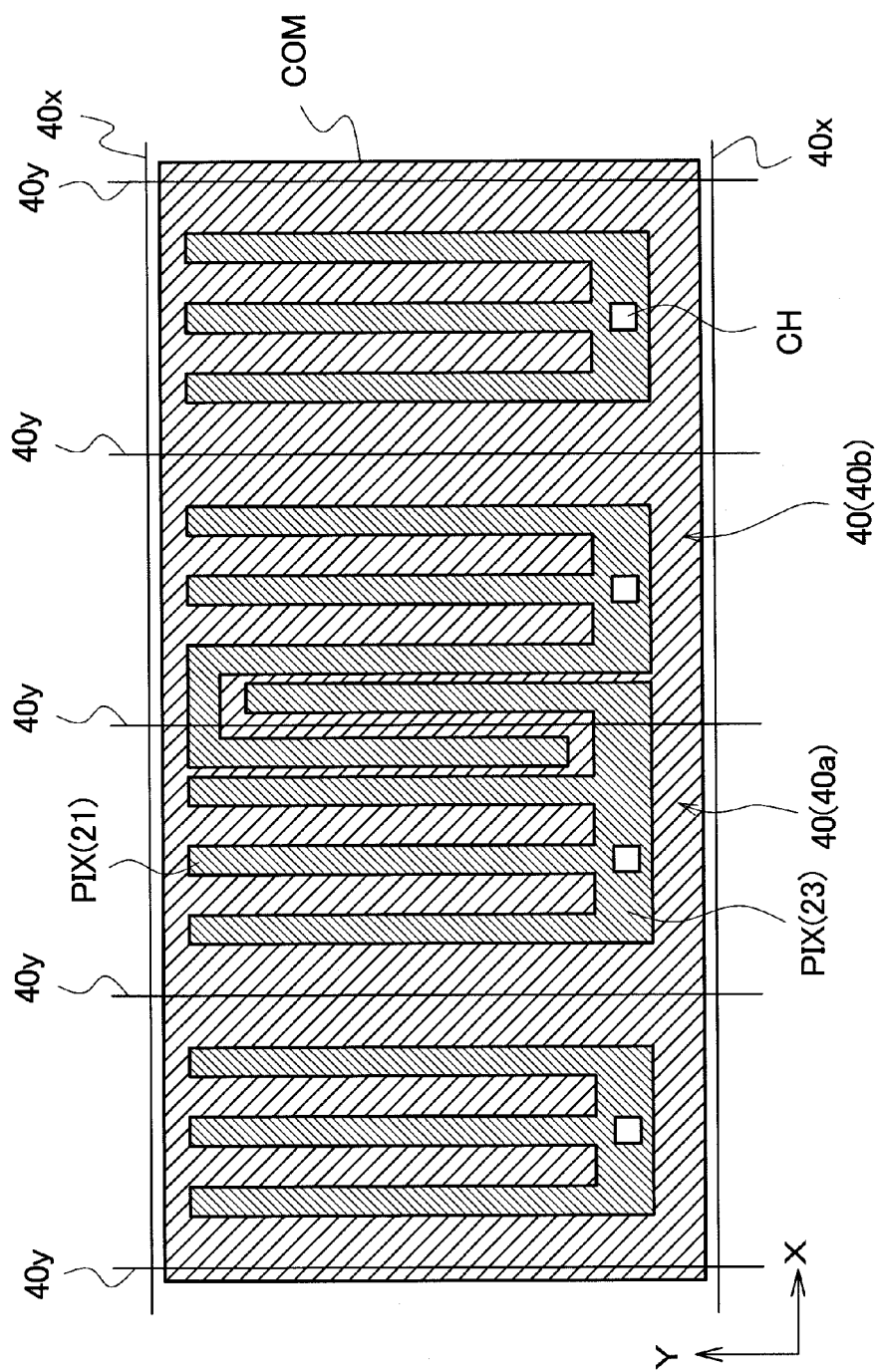
FIG. 5 is a plan view of a transmissive liquid crystal display device of IPS mode in a second embodiment of the invention, showing pixel electrodes and opposing electrodes on the side of a TFT substrate of a liquid crystal display panel.
Figure 6:
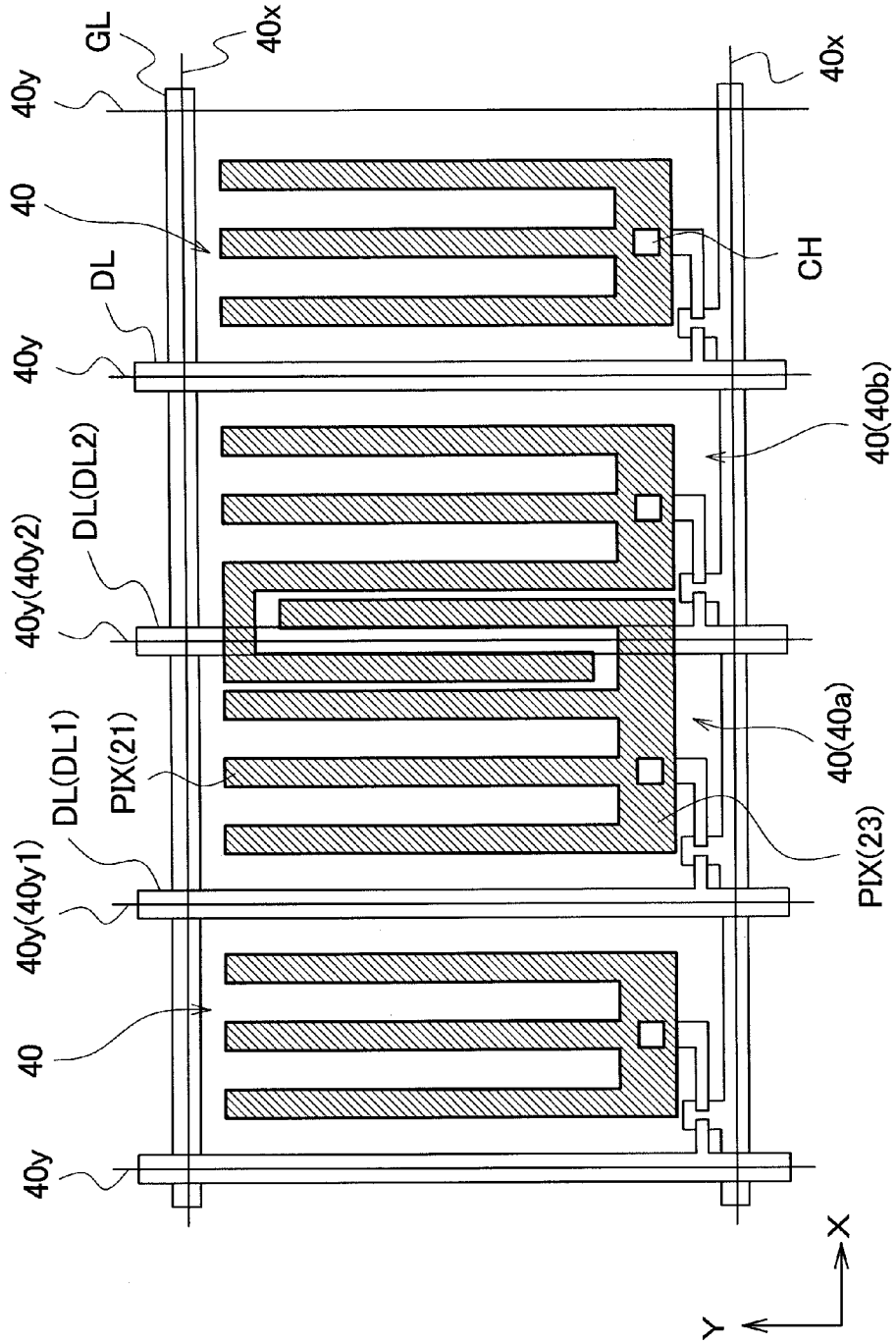
FIG. 6 is a plan view of the transmissive liquid crystal display device of IPS mode in the second embodiment of the invention, showing the pixel electrodes, scan lines, and video lines of a liquid crystal display panel.

FIGS. 5 and 6 are each a diagram showing a transmissive liquid crystal display device of IPS mode in a second embodiment of the invention. Specifically, FIG. 5 is a plan view of a liquid crystal display panel, showing pixel electrodes and opposing electrodes on the side of a TFT substrate thereof, and FIG. 6 is a plan view of the liquid crystal display panel, showing the pixel electrodes, scan lines, and video lines thereof.

The transmissive liquid crystal display device of IPS mode in the second embodiment is basically of the same configuration as that of the first embodiment described above, but is different therefrom as below.

That is, as to the first embodiment described above, in the first and second subpixels 40a and 40b of the same color being adjacent to each other along the direction of the display lines, i.e., direction of X, in each of the pixel electrodes (PIX) of the first and second subpixels 40a and 40b, at least one of the liner portions 21 is overlaid on the pixel boundary 40y between the first and second subpixels 40a and 40b when viewed from above. On the other hand, in the second embodiment, as shown in FIGS. 5 and 6, in the pixel electrode (PIX) of the first subpixel 40 (40a), at least one of the linear portions 21 is disposed in the area of the adjacent second subpixel 40 (40b), and in the pixel electrode (PIX) of the second subpixel 40 (40b), at least one of the linear portions 21 is disposed in the area of the adjacent first subpixel 40 (40a).

Also in the second embodiment configured as such, the effect similar to that of the above-described first embodiment can be achieved.

Note that, in the second embodiment, in the pixel electrode (PIX) of the subpixel 40 (40a), at least one of the linear portions 21 is disposed in the area of the subpixel 40 (40b) adjacent thereto. Alternatively, at least in the pixel electrode (PIX) of either the first or second subpixel 40a or 40b, at least one of the liner portions 21 may be disposed in the area of the adjacent subpixel 40.

Third Embodiment

Figure 7:
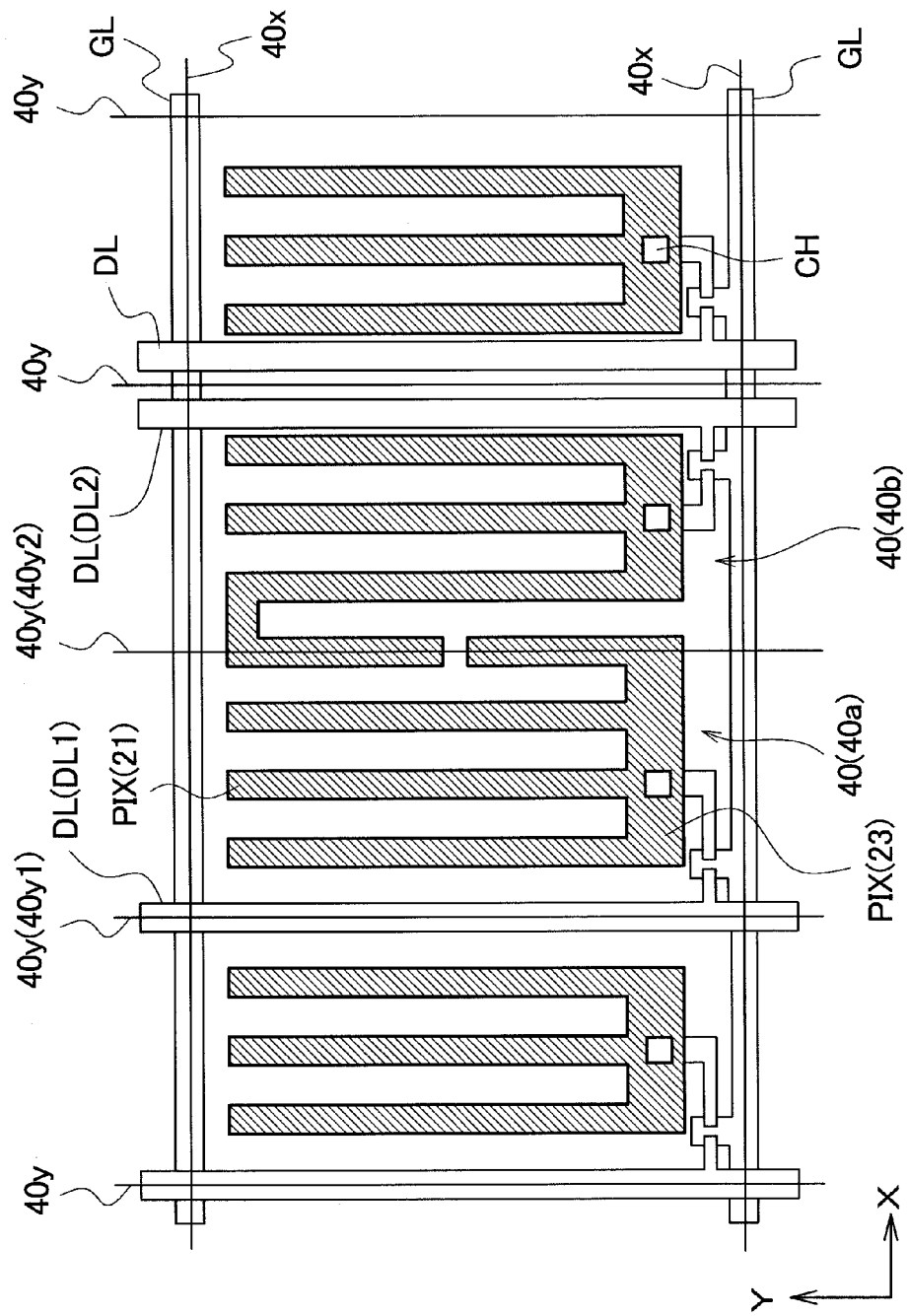
FIG. 7 is a plan view of a transmissive liquid crystal display device of IPS mode in a third embodiment of the invention, showing pixel electrodes, scan lines, and video lines of a liquid crystal display panel.

FIG. 7 is a plan view of a transmissive liquid crystal display device of IPS mode in a third embodiment of the invention, showing pixel electrodes, scan lines, and video lines of a liquid crystal display panel.

The transmissive liquid crystal display device of IPS mode in the third embodiment is basically of the same configuration as that of the first embodiment described above, but is different therefrom as below.

That is, in the first embodiment described above, in the first and second subpixels 40a and 40b of the same color being adjacent to each other along the direction of the display lines, i.e., direction of X, as shown in FIG. 3, a video line (DL1) for supply of a video signal to the pixel electrode (PIX) of the first subpixel 40 (40a) is disposed to overlay on, when viewed from above, a pixel boundary (40y1) between the first subpixel 40 (40a) and the second subpixel 40 (40b) adjacent thereto. Also as shown in FIG. 3, a video line (DL2) for supply of a video signal to the pixel electrode (PIX) of the second subpixel 40 (40b) is disposed to overlay on, when viewed from above, a pixel boundary (40y2) between the first and second subpixels 40 (40a, 40b).

On the other hand, in the third embodiment, as shown in FIG. 7, the video line (DL1) for supply of a video signal to the pixel electrode (PIX) of the first subpixel 40 (40*a*) is disposed to oppose the video line (DL2) for supply of a video signal to the pixel electrode (PIX) of the second subpixel 40 (40*b*) with a pixel boundary (40*y*2) of the first and second subpixels 40 (40*a*, 40*b*) located therebetween.

In this third embodiment, as an example, the video line (DL1) for supply of a video signal to the pixel electrode (PIX) of the first subpixel 40 (40*a*) is so disposed as to overlay on the pixel boundary (40*y*1) when viewed from above, and the video line (DL2) for supply of a video signal to the pixel electrode (PIX) of the second subpixel 40 (40*b*) is so disposed as to be closer to the side of the second subpixel 40 (40*b*) and any of the subpixels 40 adjacent to the second subpixel 40 (40*b*).

As such, by disposing the video line (DL2) for supply of a video signal to the pixel electrode (PIX) of the second subpixel 40 (40*b*) closer to the side of any of the subpixels 40 adjacent to the second subpixel 40 (40*b*), the aperture ratio is increased in the two subpixels 40 (40*a*, 40*b*) of the same color being adjacent to each other along the direction of the display lines, i.e., direction of X.

Fourth Embodiment

Figure 8:
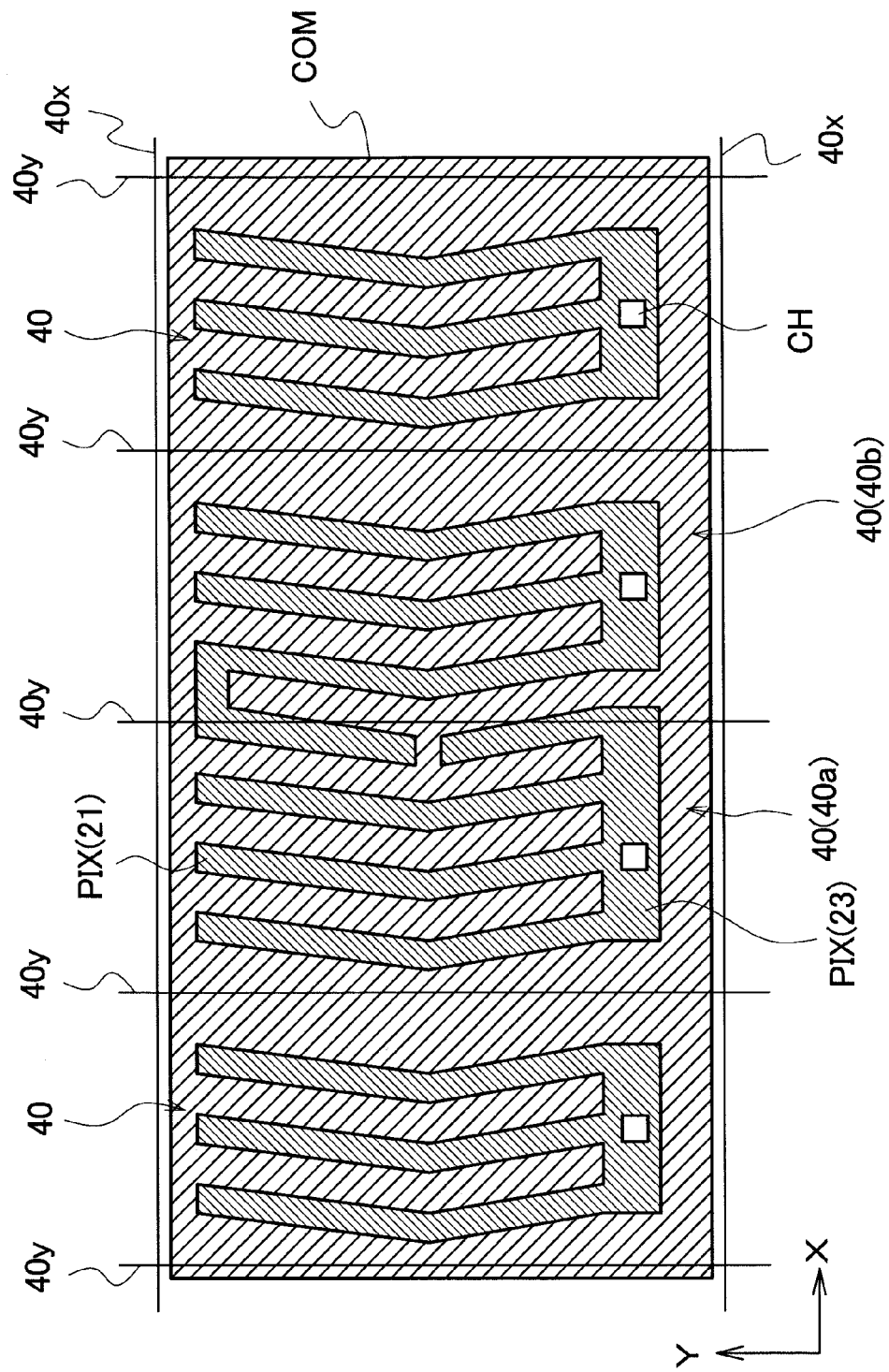
FIG. 8 is a plan view of a transmissive liquid crystal display device of IPS mode in a fourth embodiment of the invention, showing pixel electrodes and opposing electrodes on the side of a TFT substrate of a liquid crystal display panel.

FIG. 8 is a plan view of a transmissive liquid crystal display device of IPS mode in a fourth embodiment of the invention, showing pixel electrodes and opposing electrodes on the side of a TFT substrate of a liquid crystal display panel.

The transmissive liquid crystal display device of IPS mode in the fourth embodiment is basically of the same configuration as that of the first embodiment described above, but therein, the configuration of a multi-domain pixel electrode is different therefrom as below.

That is, a pixel electrode (PIX) of the fourth embodiment is of the multi-domain configuration as shown in FIG. 8.

In the first embodiment described above, in the pixel electrode (PIX) of each of the first and second subpixels 40*a* and 40*b* of the same color being adjacent to each other along the direction of the display lines, i.e., direction of X, the four linear portions are extending in a direction along which the video line (DL) is extended. On the other hand, in the fourth embodiment, one of the four linear portions 21 disposed also to the area of any adjacent subpixel beyond the pixel boundary (40*y*) between the first and second subpixels 40 (40*a*, 40*b*) is slanted against the pixel boundary (40*y*), and, the remaining three linear portions not including the linear portion slanted against the pixel boundary (40*y*2) are all bent.

Also in the fourth embodiment configured as such, the effect similar to that of the above-described first embodiment can be achieved.

Also in this embodiment, the molecules in the liquid crystal layer (LC) can be multi-domain-oriented, thereby being able to increase the characteristics of viewing angle range.

Fifth Embodiment

Figure 9:
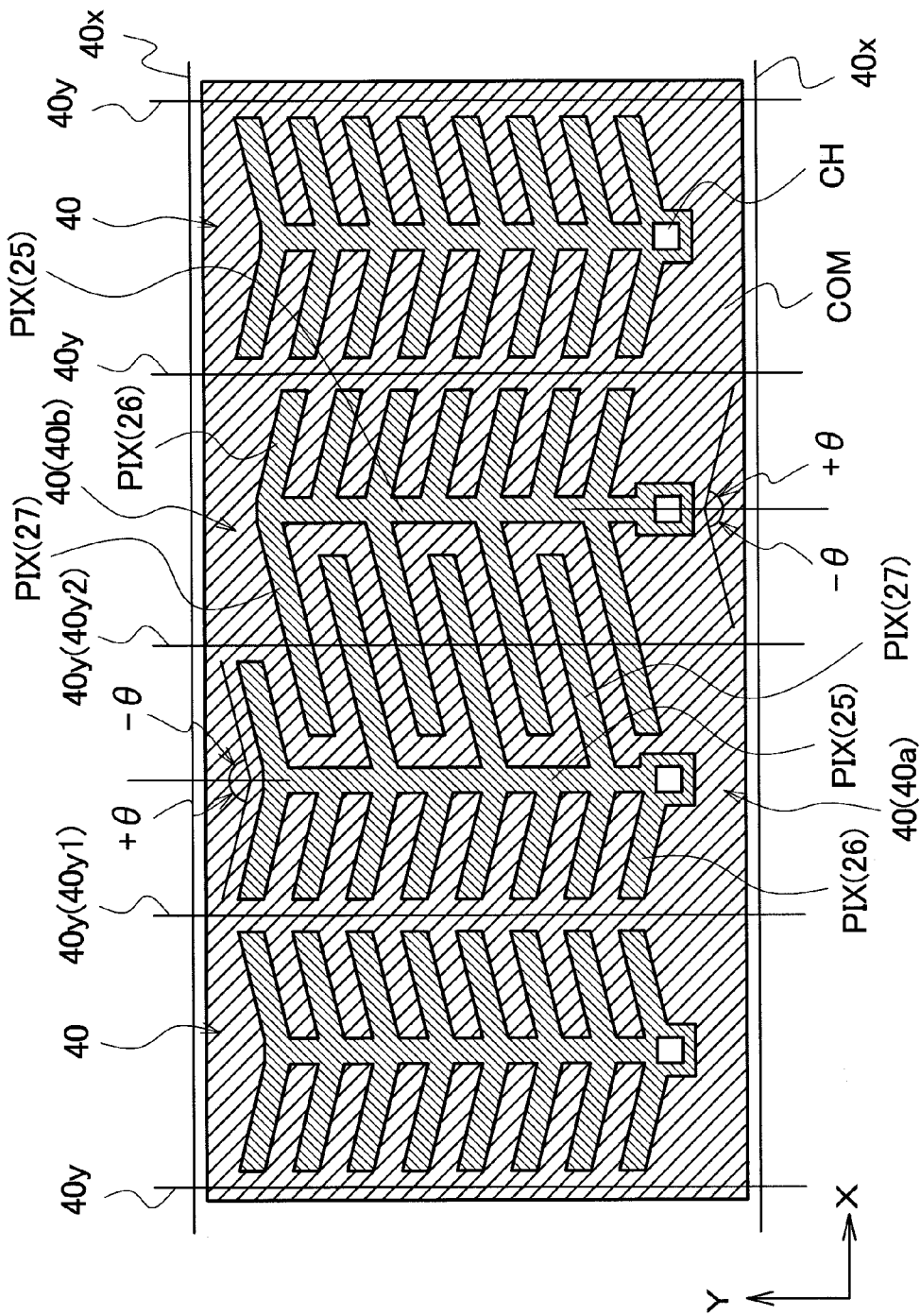
FIG. 9 is a plan view of a transmissive liquid crystal display device of IPS mode in a fifth embodiment of the invention, showing pixel electrodes and opposing electrodes on the side of a TFT substrate of a liquid crystal display panel.

FIG. 9 is a plan view of a transmissive liquid crystal display device of IPS mode in a fifth embodiment of the invention, showing pixel electrodes and opposing electrodes on the side of a TFT substrate of a liquid crystal display panel.

The transmissive liquid crystal display device of IPS mode in the fifth embodiment is basically of the same configuration as that of the first embodiment described above, but therein, the configuration of a pixel electrode is different therefrom as below.

That is, a pixel electrode (PIX) of the fifth embodiment is of the multi-domain configuration as shown in FIG. 9.

The pixel electrode (PIX) of the multi-domain configuration includes a first linear portion 25, a plurality of second linear portions 26, and a plurality of third linear portions 27. The first linear portion 25 extends along the direction orthogonal to the direction of the display lines. The second linear portions 26 are each protruding from the first linear portion 25 with a slope of $\theta$ with respect to the first linear portion 25, and are disposed at predetermined intervals in a direction along which the first linear portion 25 is extended. The third linear portions 27 are each protruding also from the first linear portion 25 but to the side opposite to the second linear portions 26 with a slope of $-\theta$ with respect to the first linear portion 25, and are disposed at predetermined intervals in the direction along which the first linear portion 25 is extended. Herein, preferably, $\theta=70$ to $87°$.

In the first and second subpixels 40*a* and 40*b* of the same color being adjacent to each other along the direction of the display lines, i.e., direction of X, in the pixel electrode (PIX) of the first subpixel 40 (40*a*), the third linear portions 27 are disposed also to the area of the second subpixel 40 (40*b*) beyond the pixel boundary (40*y*2) between the first and second subpixels 40*a* and 40*b*, and in the pixel electrode (PIX) of the second subpixel 40 (40*b*), the third linear portions 27 are disposed also to the area of the first subpixel 40 (40*a*) beyond the pixel boundary (40*y*2) between the first and second subpixels 40 (40*a* and 40*b*).

Also in the fifth embodiment configured as such, the effect similar to that of the above-described first embodiment can be achieved. Moreover, similarly to the embodiment described above, the molecules in the liquid crystal layer (LC) can be multi-domain-oriented, thereby being able to increase the characteristics of viewing angle range.

Sixth Embodiment

Figure 10:
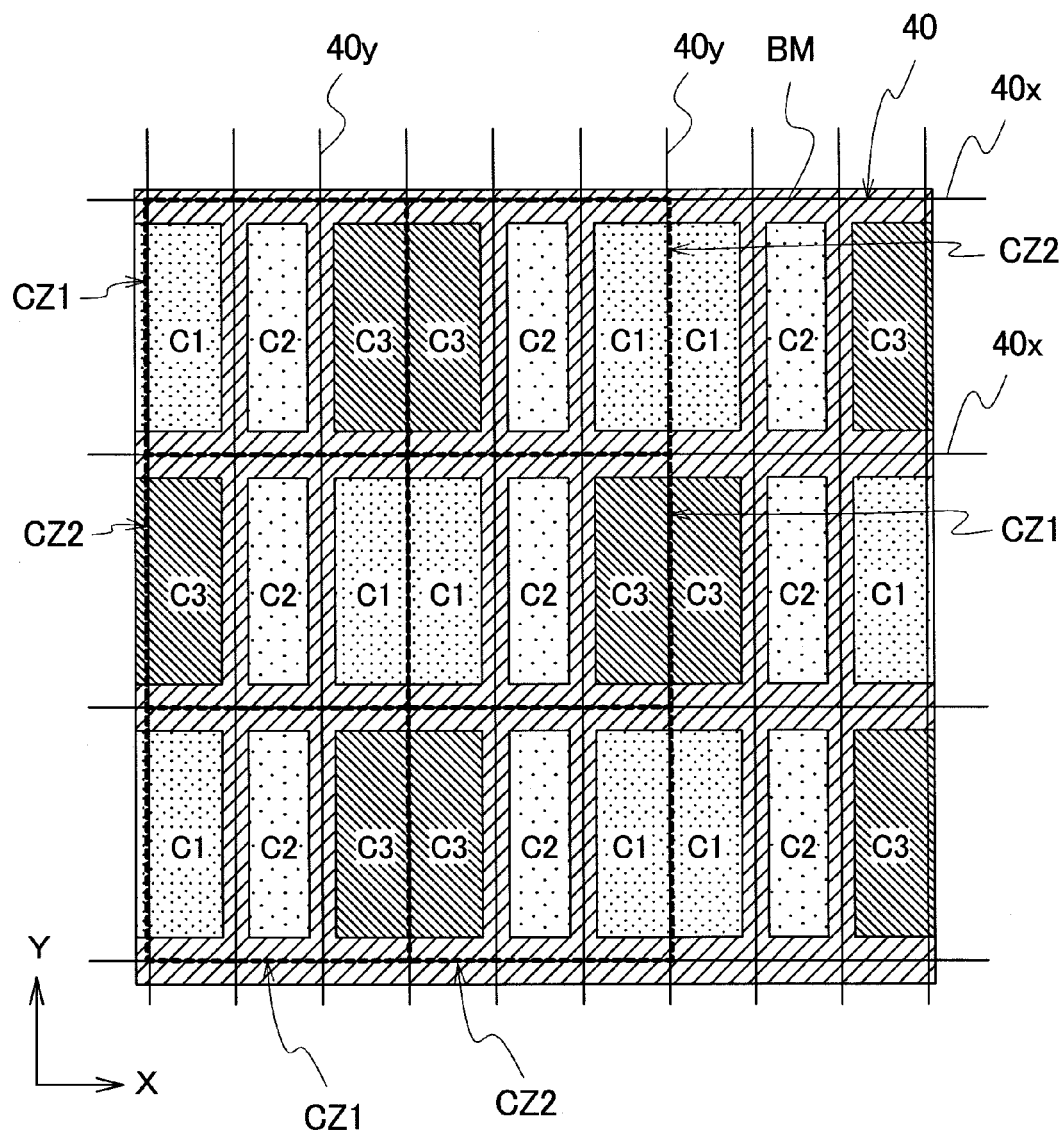
FIG. 10 is a plan view of a liquid crystal display device in a sixth embodiment of the invention, showing the layout of color filters in a liquid crystal display panel.

FIG. 10 is a plan view of a liquid crystal display device in a sixth embodiment of the invention, showing the layout of color filters of a liquid crystal display panel. This drawing corresponds to FIG. 1 of the first embodiment.

In FIG. 10, the colors of the color filters C1 and C3 are alternately changed for every line. That is, assuming that any two adjacent display lines are first and second display lines, the first group (first pixel) CZ1 of the first display line is disposed adjacent to the second group (second pixel) CZ2 of the second display line in the direction of the arrangement of the display lines, i.e., direction of Y. Such a layout can favorably prevent any specific display screen from being looked unusual, e.g., checker pattern.

Seventh Embodiment

Figure 11:
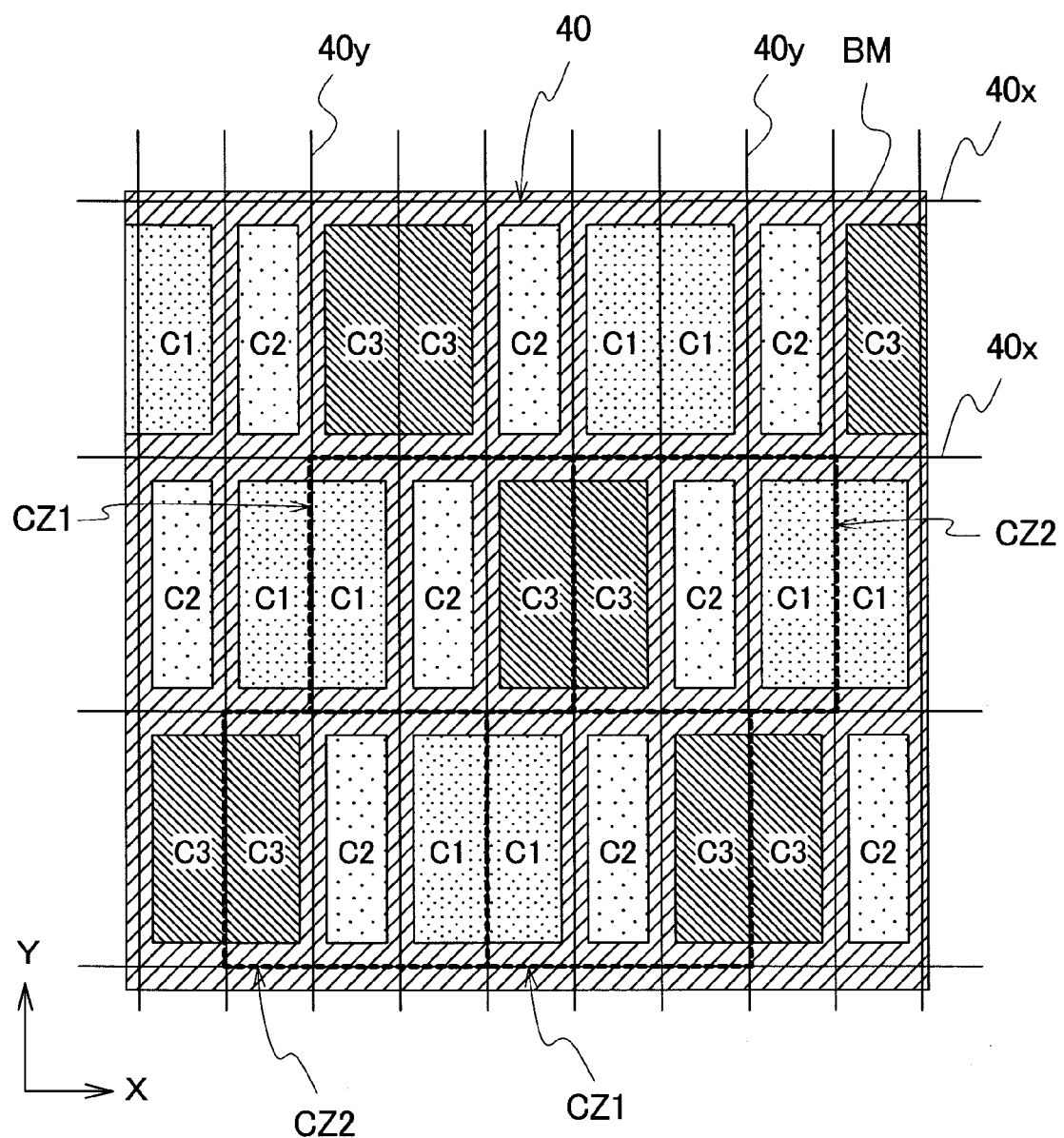
FIG. 11 is a plan view of a liquid crystal display device in a seventh embodiment of the invention, showing the layout of color filters in a liquid crystal display panel.

FIG. 11 is a plan view of a liquid crystal display device in a seventh embodiment of the invention, showing the layout of color filters of a liquid crystal display panel. This drawing corresponds to FIG. 1 of the first embodiment.

In FIG. 11, the colors of the color filters C1, C2, and C3 are changed on a line basis so as to allow periodic configuration of the color filters C1, C2, and C3 in the row direction. Such a layout can favorably prevent any specific display screen from being looked unusual, e.g., checker pattern.

Eighth Embodiment

Figure 12:
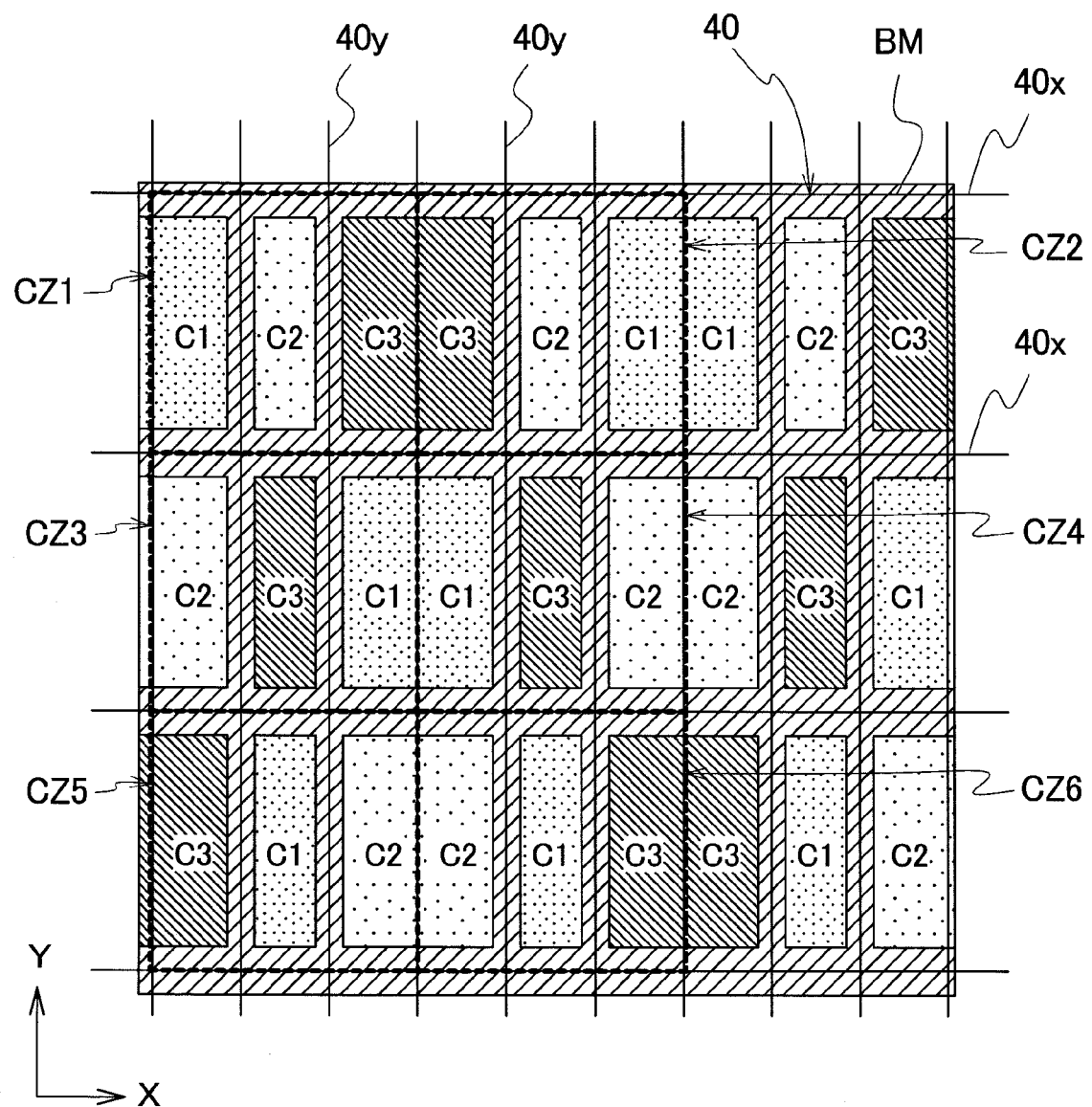
FIG. 12 is a plan view of a liquid crystal display device in an eighth embodiment of the invention, showing the layout of color filters in a liquid crystal display panel.

FIG. 12 is a plan view of a liquid crystal display device in an eighth embodiment of the invention, showing the layout of color filters of a liquid crystal display panel. This drawing corresponds to FIG. 1 of the first embodiment.

In FIG. 12, the color adjacency between the subpixels is achieved among every color of the color filters C1, C2, and C3. Such a layout allows the colors to share the same average aperture ratio, thereby being able to prevent any specific display screen from being looked unbalanced in terms of color. Moreover, the color filters C1, C2, and C3 are so disposed as to achieve periodic configuration thereof also in the row direction, thereby being able to favorably prevent any specific display screen from being looked unusual, e.g., checker pattern.

The layout of the color filters in this embodiment is described here in more detail.

Assuming that there are three adjacent display lines, the first display line (the top line in the drawing) includes a first group (first pixel) CZ1 including three subpixels 40 of red (C1), green (C2), and blue (C3) being arranged in this order, and a second group (second pixel) CZ2 including three subpixels 40 of blue (C3), green (C2), and red (C1) being arranged in this order. These first and second groups of CZ1 and CZ2 are alternately and repeatedly disposed along the direction of X in such a manner that the two subpixels 40 of red (C1) and the two subpixels 40 of blue (C3) are respectively adjacent.

The second display line (the middle line in the drawing) includes a third group (third pixel) CZ3 including three subpixels 40 of green (C2), blue (C3), and red (C1) being arranged in this order, and a fourth group (fourth pixel) CZ4 including three subpixels 40 of red (C1), blue (C3), and green (C2) being arranged in this order. These third and fourth groups of CZ3 and CZ4 are alternately and repeatedly disposed along the direction of X in such a manner that the two subpixels 40 of green (C2) and the two subpixels 40 of red (C1) are respectively adjacent.

The third display line (the bottom line in the drawing) includes a fifth group (fifth pixel) CZ5 including three subpixels 40 of blue (C3), red (C1), and green (C2) being arranged in this order, and a sixth group (sixth pixel) CZ6 including three subpixels 40 of green (C2), red (C1), and blue (C3) being arranged in this order. These fifth and sixth groups of CZ5 and CZ6 are alternately and repeatedly disposed along the direction of X in such a manner that the two subpixels 40 of blue (C3) and the two subpixels 40 of green (C2) are respectively adjacent.

Ninth Embodiment

In a ninth embodiment, the effect of the invention is described.

Figure 18:
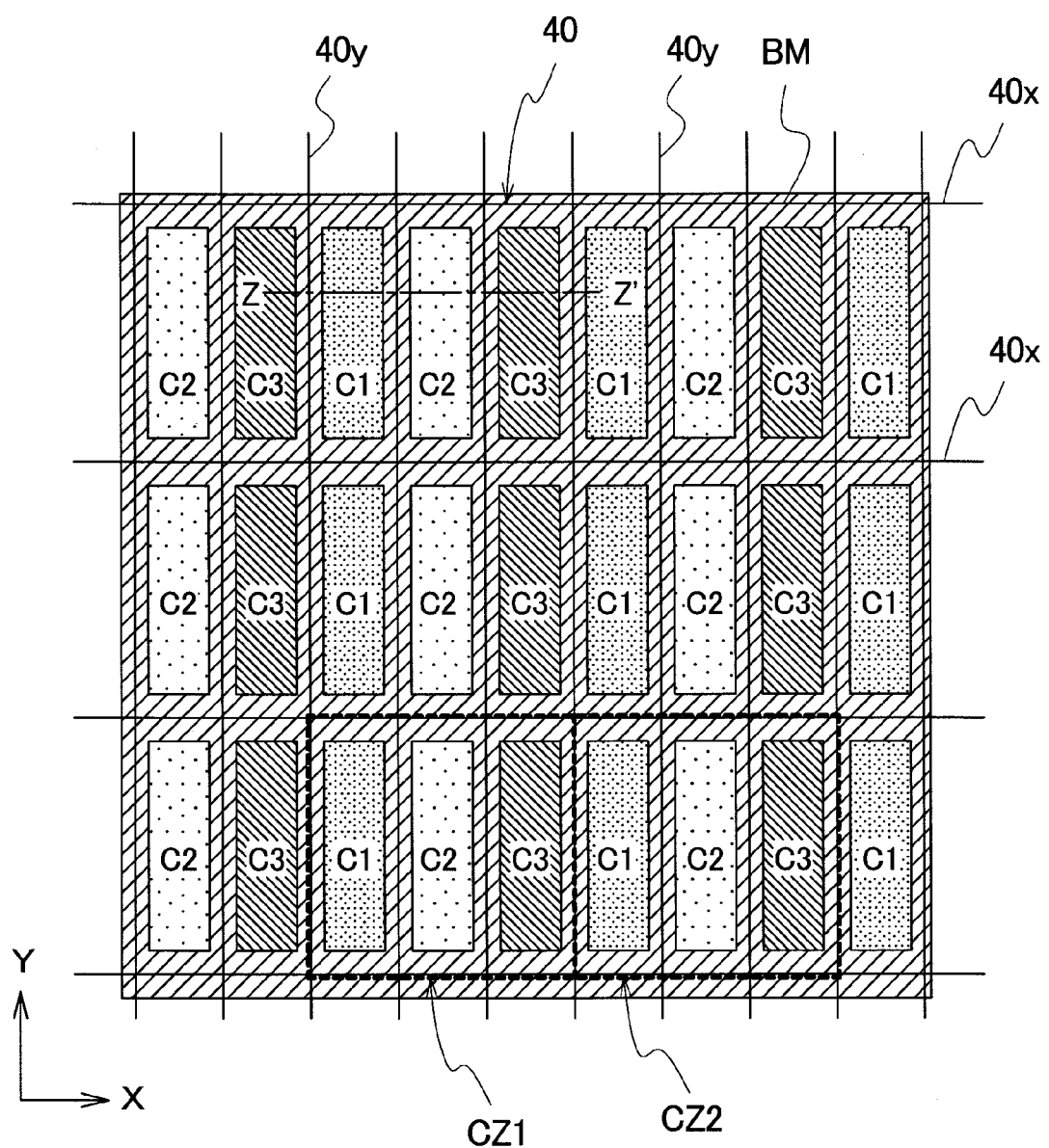
FIG. 18 is a plan view of a previous liquid crystal display device, showing the layout of color filters of a liquid crystal display panel.
Figure 19:
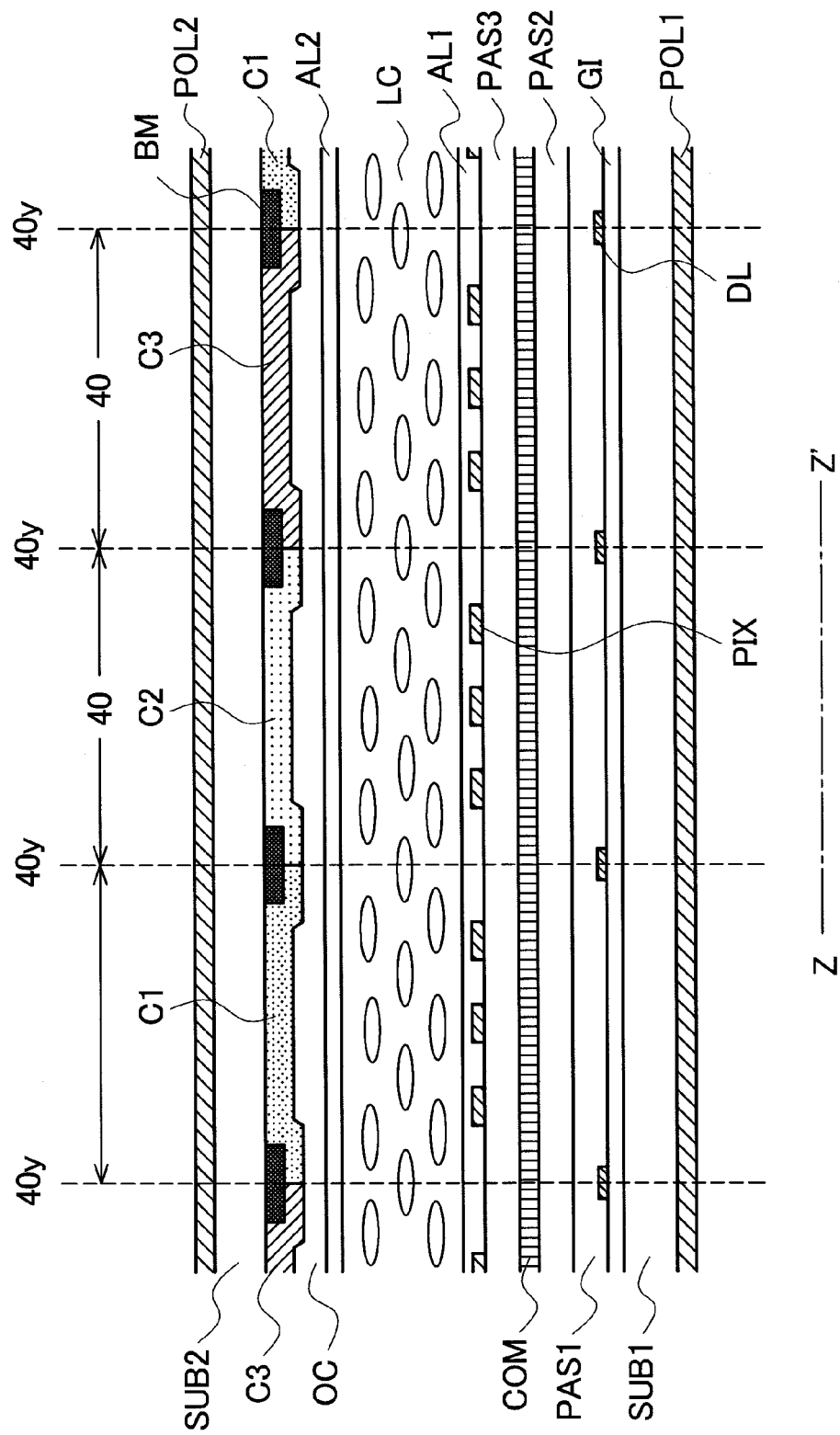
FIG. 19 is a cross-sectional view of the previous liquid crystal display panel, showing the cross-sectional configuration thereof cut along a line Z-Z' of FIG. 18.
Figure 20:
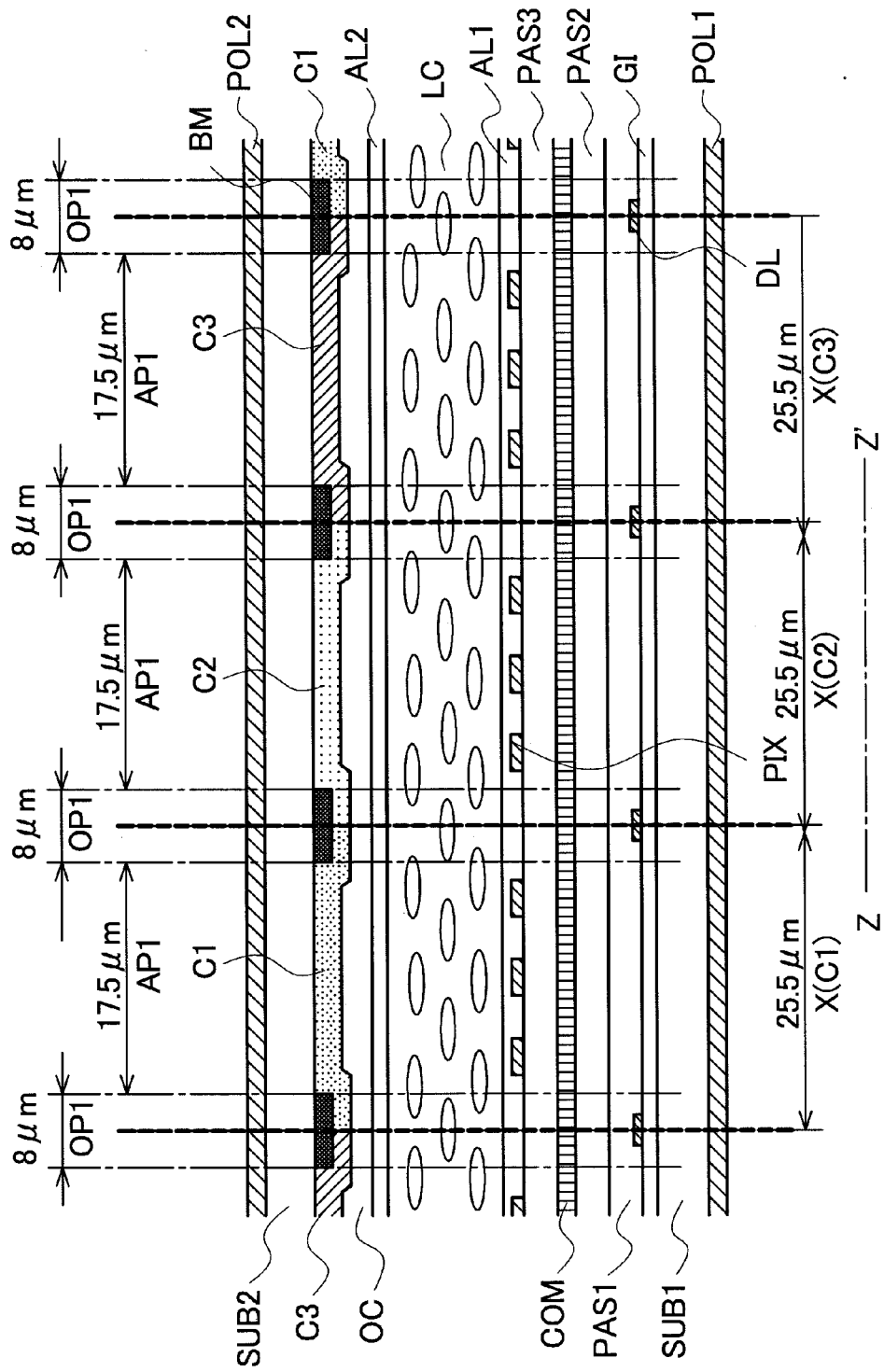
FIG. 20 is a cross-sectional view of the previous liquid crystal display panel of FIG. 19 with an exemplary dimension scale.

Described first is the configuration of a previous liquid crystal display device. FIG. 18 is a plan view of the previous liquid crystal display panel, showing the layout of color filters. FIG. 19 is a diagram showing the cross-sectional configuration of a previous liquid crystal display panel, showing the cross-sectional configuration thereof cut along a line Z-Z' of FIG. 18. FIG. 20 is a cross-sectional view of the liquid crystal display panel of FIG. 19 with an exemplary dimension scale.

In FIG. 20, each of the subpixels 40 has the width of 25.5 μm, and a pixel has the width of 76.5 μm (25.5 μm×3). Assuming that a light-shielding film (BM) has the width of 8 μm, the aperture width of each of the subpixels 40 will be 17.5 μm (25.5 μm−8 μm), and the aperture width of a pixel will be 52.5 μm (17.5 μm×3).

Figure 13:
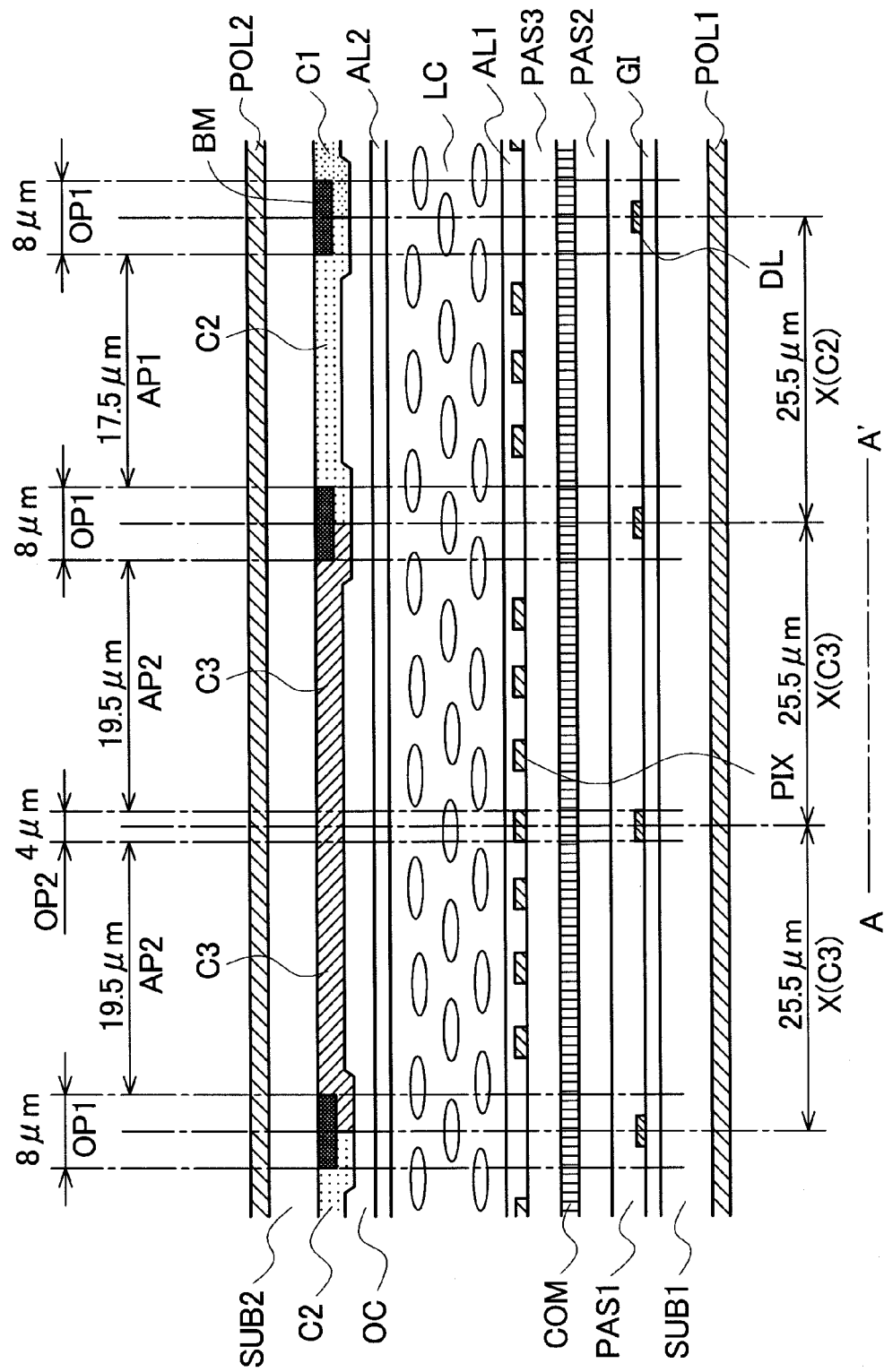
FIG. 13 is a cross-sectional view of a liquid crystal display device in a ninth embodiment of the invention, showing the cross-sectional configuration of a liquid crystal display panel cut along the position corresponding to the line A-A' of FIG. 1.

Described next is the configuration of the liquid crystal display device of the invention. FIG. 13 is a cross-sectional diagram of a liquid crystal display device in the ninth embodiment of the invention, showing the cross-sectional configuration of a liquid crystal display panel thereof at the position corresponding to the line A-A' of FIG. 1.

In FIG. 13, a subpixel has the width of 25.5 μm, and a pixel has the width of 76.5 μm (25.5 μm×3). Assuming that a light-shielding film (BM) has the width of 8 μm, the aperture width of a subpixel 40 provided with the light-shielding film (BM) at one end will be 19.5 μm (25.5 μm−4 μm−2 μm), and the aperture width of a subpixel 40 provided with the light-shielding film (BM) at both ends will be 17.5 μm (25.5 μm−8 μm). The aperture width of a pixel will be 56.5 μm (19.5 μm×2+17.5 μm×1).

Assuming that the liquid crystal display panel of the invention and the previous liquid crystal display panel share the same length in the depth direction, i.e., direction of Y, the aperture ratio will be proportionate to the aperture width. Comparing the aperture ratio (aperture width) between the liquid crystal display panel of the invention and the previous liquid crystal display panel, the resulting ratio (panel of the invention/previous panel) will be 56.5/52.5≅1.08, and it tells that the configuration of the invention leads to an increase of aperture ratio of about 8% compared with the previous configuration.

Note that, in this embodiment, although a subpixel has the width of 25.5 μm, in a high-definition panel in which a subpixel has the width smaller than 25.5 μm, the black matrix occupies the larger area in the subpixel. Accordingly, with the higher definition, the effect to be achieved by the increase of aperture ratio can be increased.

Tenth Embodiment

In a tenth embodiment, a modified example of the invention and the effect thereof are described.

First of all, described is the configuration of the previous liquid crystal display device. In FIG. 20, each of the subpixels 40 has the width of 25.5 μm, and a pixel has the width of 76.5 μm (25.5 μm×3). Assuming that a light-shielding film (BM) has the width of 8 μm, the aperture width of each of the subpixels 40 will be 17.5 μm (25.5 μm−8 μm), and the aperture width of a pixel will be 52.5 μm (17.5 μm×3).

Figure 14:
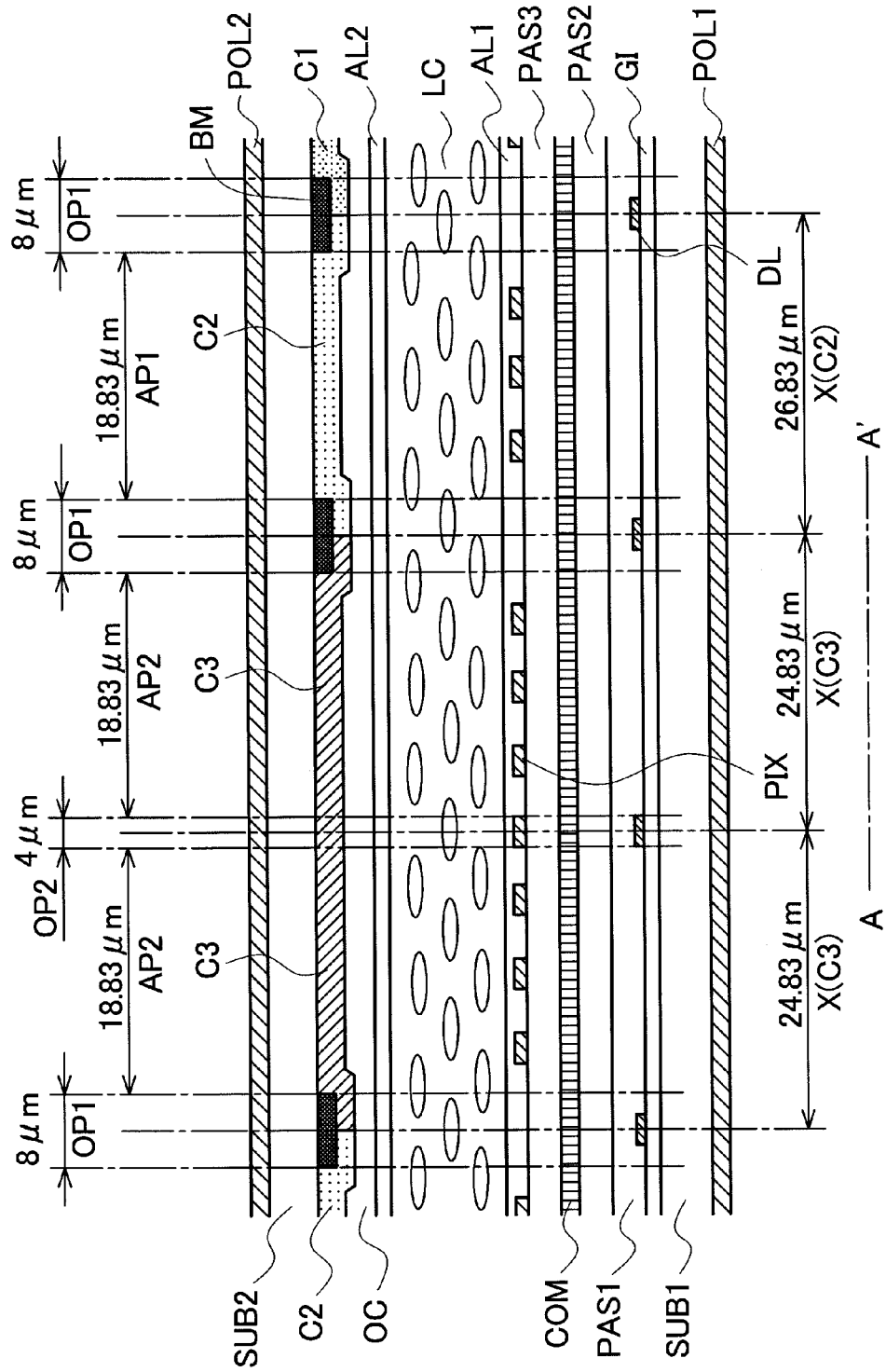
FIG. 14 is a cross-sectional view of a liquid crystal display device in a tenth embodiment of the invention, showing the cross-sectional configuration of a liquid crystal display panel cut along the position corresponding to the line A-A' of FIG. 1.

Described next is the configuration of the liquid crystal display device of the invention. FIG. 14 is a cross-sectional diagram of a liquid crystal display device in a tenth embodiment of the invention, showing the cross-sectional configuration of a liquid crystal display panel thereof at the position corresponding to the line A-A' of FIG. 1.

In FIG. 14, the subpixel 40 having a light-shielding film (BM) only at one end is different in width from the subpixel 40 having a light-shielding film (BM) at both ends. The subpixel 40 having a light-shielding film (BM) only at one end has the width of 24.83 μm, and the subpixel 40 having a light-shielding film (BM) at both ends has the width of 26.83 μm. Such a width difference is intended to make every subpixel 40 has the same aperture width. In this case, assuming that the light-shielding film (BM) has the width of 8 every subpixel 40 will have the aperture width of 18.83 μm, and the aperture width of a pixel will be 56.5 μm (18.83 μm×3).

Assuming that the liquid crystal display panel of the invention and the previous liquid crystal display panel share the same length in the depth direction, i.e., direction of Y, the aperture ratio will be proportionate to the aperture width. Comparing the aperture ratio (aperture width) between the liquid crystal display panel of the invention and the previous liquid crystal display panel, the resulting ratio (panel of the invention/previous panel) will be 56.5/52.5≅1.08, and it tells that the configuration of the invention leads to an increase of aperture ratio of about 8% compared with the previous configuration.

Note that, in this embodiment, although a pixel has the width of 76.5 μm, in a high-definition panel in which a pixel has the width smaller than 76.5 μm, the black matrix occupies the larger area in the subpixel. Accordingly, with the higher definition, the effect to be achieved by the increase of aperture ratio can be increased.

Moreover, in this embodiment, every subpixel (every color) has the same aperture width, thereby being able to achieve display with no lack of color balance.

Eleventh Embodiment

Figure 21:
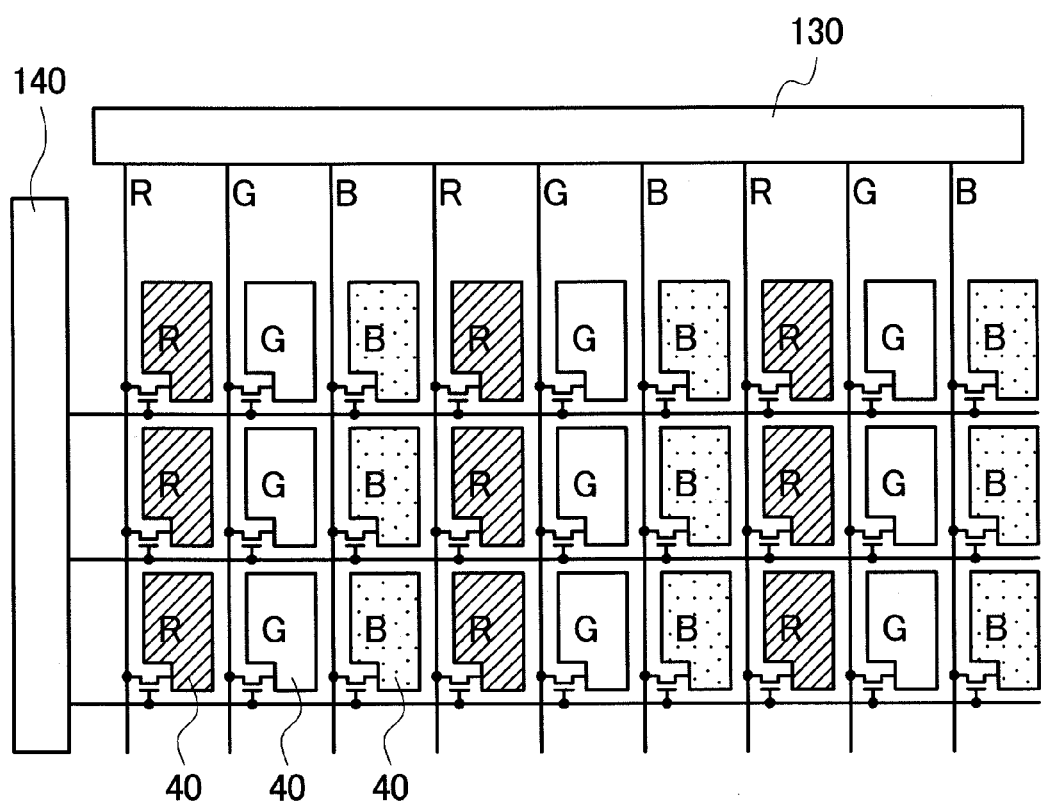
FIG. 21 is a diagram of the previous liquid crystal display device, showing the configuration of a video voltage output circuit.

An eleventh embodiment relates to a video voltage output circuit. FIG. 21 shows the configuration of a previous output circuit. In FIG. 21, a reference numeral 130 denotes a video line drive circuit, and a reference numeral 140 denotes a scan line drive circuit.

In the previous output circuit, subpixels are arranged in order of RGBRGB, and thus the video voltage coming from the video line drive circuit 130 is also provided in order of RGBRGB.

Figure 15:
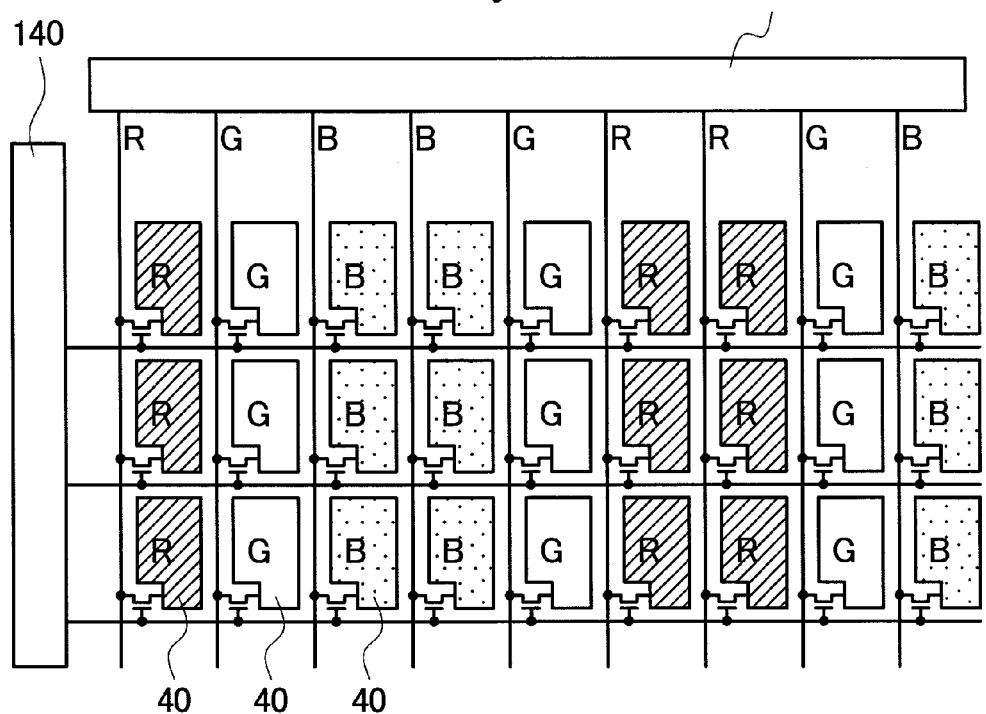
FIG. 15 is a first configuration diagram of a liquid crystal display device in an eleventh embodiment of the invention, showing a video voltage output circuit.
Figure 16:
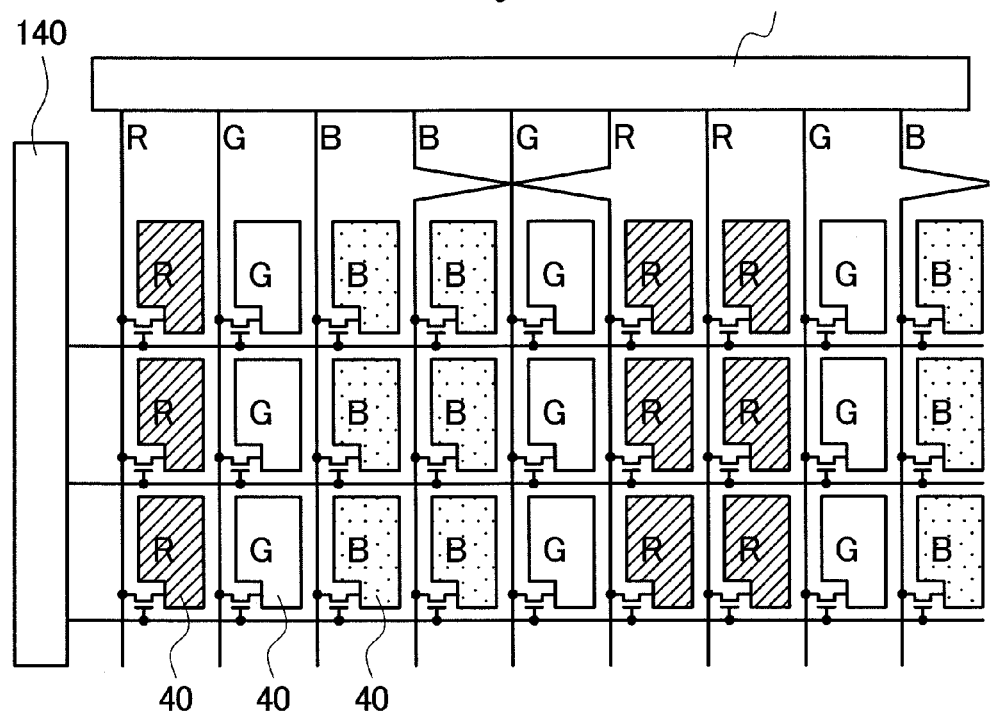
FIG. 16 is a second configuration diagram of the liquid crystal display device in the eleventh embodiment of the invention, showing the video voltage output circuit.

FIGS. 15 and 16 each show the configuration of the video voltage output circuit of this embodiment. In FIG. 15, in accordance with the arrangement of the subpixels in order of RGBBGR, the video voltage coming from the video line drive circuit 130 is put in order of RGBBGR.

In FIG. 16, the video voltage coming from the video line drive circuit 130 is in the same order as previous RGBRGB, but the subpixels are arranged in order of RGBBGR, in the group including the subpixels in the order of BGR, the video line of R and the video line of B are crossed to each other, thereby changing the order of the subpixels to RGBBGR. For crossing the signal lines, there is a method of connection for another wiring using a contact hole via an interlayer insulation film.

Twelfth Embodiment

Figure 17:
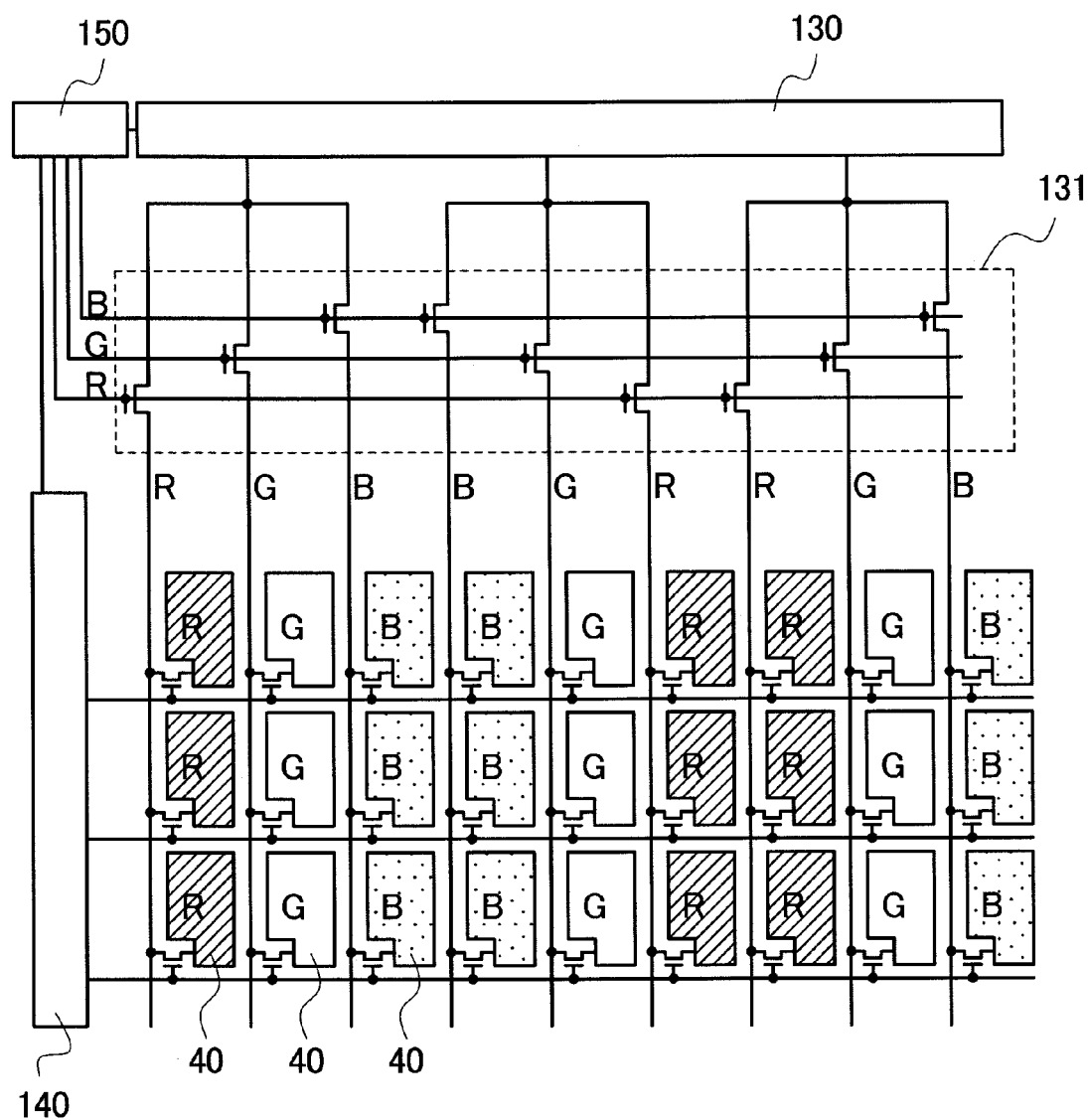
FIG. 17 is a configuration diagram of a liquid crystal display device in a twelfth embodiment of the invention, showing a video voltage output circuit.

A twelfth embodiment also relates to the video voltage output circuit. FIG. 17 is a diagram showing the configuration of the video voltage output circuit in this embodiment. Note that, in FIG. 17, a reference numeral 131 denotes an RGB selection circuit, and a reference numeral 150 denotes a power supply.

In this embodiment, in a horizontal scanning period, the video line drive circuit 130 outputs the video voltage in order of R, G, and B. In response thereto, the RGB selection circuit 131 makes the video line drive circuit 130 to provide the video voltage to the video lines of R, G, and B, respectively. The video voltage here is the one coming in order of R, G, and B.

In this embodiment, by changing a control signal for application to a gate of a switching element SW of the RGB selection circuit 131, the video voltage coming from the video line drive circuit 130 in order of R, G, and B can be changed to the order of RGBBGR.

While the invention proposed by the inventors has been described in detail by way of embodiments, the foregoing description is in all aspects illustrative and not restrictive. It is understood that numerous other modifications and variations can be devised without departing from the scope of the invention.

For example, the invention is applicable also to a display device of any other mode such as organic EL (ElectroLuminescent).

The invention is also applicable to a semi-transmissive liquid crystal display device in which a plurality of subpixels are each provided with a transmission section and a reflection section.

What is claimed is:

1. A liquid crystal display device comprising:
a first substrate;
a second substrate;
a liquid crystal layer sandwiched between the first and second substrates;
a light-shielding film provided to the second substrate;
a plurality of subpixels arranged in a matrix form on the first substrate;
a first electrode formed on the first substrate for each of the subpixels;
a second electrode formed on another layer of the first electrodes for each of the subpixels; and
a color filter formed on the second substrate for each of the subpixels;
wherein the second electrodes each include a plurality of linear portions;
wherein the subpixels include first and second subpixels that are adjacent to each other;
wherein a signal line forms between the first subpixel and second subpixel, and the color filter is formed across the signal line in the same color; and
wherein the second electrodes of the first and second subpixels are formed separately, and the second electrode of the first subpixel is disposed to an area of the second subpixel beyond the signal line.

2. A liquid crystal display device according to claim 1, wherein in the second electrode of the first subpixel, when viewed from above, at least one of the linear portions thereof is overlaid on the signal line formed between the first and second subpixels.

3. A liquid crystal display device according to claim 1, wherein in the second electrode of the first subpixel, at least one of the linear portions thereof is disposed to the area of the second subpixel.

4. A liquid crystal display device according to claim 1, wherein the first and second subpixels share the same color filter.

5. A liquid crystal display device according to claim 1, wherein the subpixels are divided into first and second groups each including three of the subpixels, and the subpixels in the first group are arranged in order of first, second, and third colors, and the subpixels in the second group are arranged in order of third, second, and first colors; and
wherein the three subpixels in the first group and the three subpixels in the second group are alternately disposed in the direction of a display line.

6. A liquid crystal display device according to claim 1, wherein the second electrode is disposed on the layer upper than the first electrode with an insulation film disposed therebetween.

7. A liquid crystal display device according to claim 1, wherein the second electrode is a pixel electrode, and
wherein the first electrode is a flat-shaped opposing electrode.

8. A liquid crystal display device according to claim 1, wherein in the second electrode, the linear portions are each bent.

9. A liquid crystal display device according to claim 1, wherein the linear portions of the second electrode include:
a first linear portion extending along a direction orthogonal to a direction of a display line;

a plurality of second linear portions each being protruded from the first linear portion with a slope of θ, where θ is 70° to 87°, with respect to the first linear portion, and being disposed at predetermined intervals in a direction along which the first linear portion is extended; and a plurality of third linear portions each being protruded to a side opposite to the second linear portions from the first linear portion with a slope of −θ with respect to the first linear portion, and being disposed at predetermined intervals in a direction along which the first linear portion is extended;

wherein the second electrode of the first subpixel is disposed also to the area of the second subpixel with the third linear portions each beyond the pixel boundary between the first and second subpixels; and wherein the second electrode of the second subpixel is also disposed to an area of the first subpixel with the third linear portions each beyond the pixel boundary between the first and second subpixels.

10. A liquid crystal display device comprising:

a first substrate;

a second substrate;

a liquid crystal layer sandwiched between the first and second substrates;

a light-shielding film provided to the second substrate;

a plurality of subpixels arranged in a matrix form on the first substrate;

a first electrode formed on the first substrate for each of the subpixels a second electrode formed on another layer of the first electrodes for each of the subpixels; and a color filter formed on the second substrate for each of the subpixels;

wherein the second electrode includes a plurality of linear portions;

wherein the subpixels include first and second subpixels that are adjacent to each other and overlapped with the same color filter;

wherein the second electrode of the first subpixel is formed above an area of the first subpixel formed; and wherein the second electrode of the second subpixel is formed above an area of the second subpixels.

11. A liquid crystal display device according to claim 10, wherein in the second electrode of the first subpixel, at least one of the linear portions thereof is disposed in an area of the second subpixel.

12. A liquid crystal display device according to claim 10, wherein the first and second subpixels share the same color filter.

13. A liquid crystal display device according to claim 10, wherein the subpixels are divided into first and second groups each including three of the subpixels, and the subpixels in the first group are arranged in order of first, second, and third colors, and the subpixels in the second group are arranged in order of third, second, and first colors; and wherein the three subpixels in the first group and the three subpixels in the second group are alternately disposed in the direction of the display line.

14. A liquid crystal display device according to claim 10, wherein a liquid crystal display panel includes a first video line for input of a video signal to the first subpixel, and a second video line for input of a video signal to the second subpixel; and wherein the first and second video lines are disposed to be opposed to each other with the pixel boundary of the first and second subpixels located therebetween.

15. A liquid crystal display device according to claim 10, wherein the second electrode is disposed on the layer upper than the first electrode with an insulation film disposed therebetween.

16. A liquid crystal display device according to claim 10, wherein the second electrode is a pixel electrode, and the first electrode is a flat-shaped opposing electrode.

17. A liquid crystal display device according to claim 10, wherein in the second electrode, the linear portions are each bent.

* * * * *